(12) United States Patent
Ishiguro et al.

(10) Patent No.: US 7,717,409 B2
(45) Date of Patent: May 18, 2010

(54) ACTIVE VIBRATION ISOLATING SUPPORT APPARATUS

(75) Inventors: Tetsuya Ishiguro, Saitama (JP); Hiroaki Ue, Saitama (JP); Hirotomi Nemoto, Saitama (JP); Toshiyuki Ogino, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/380,937

(22) Filed: Mar. 5, 2009

(65) Prior Publication Data

US 2009/0224446 A1    Sep. 10, 2009

(30) Foreign Application Priority Data

Mar. 7, 2008    (JP)    ............... 2008-058687

(51) Int. Cl.
*F16F 15/00*    (2006.01)
*B60K 8/00*    (2006.01)
(52) U.S. Cl. ............................................. 267/140.14
(58) Field of Classification Search ............ 267/140.14, 267/140.15; 248/550, 562, 565
See application file for complete search history.

(56) References Cited

U.S. PATENT DOCUMENTS

| | | | | |
|---|---|---|---|---|
| 5,718,417 | A * | 2/1998 | Aoki ...................... | 267/140.14 |
| 6,073,918 | A * | 6/2000 | Kojima et al. .......... | 267/140.14 |
| 7,194,344 | B2 * | 3/2007 | Gee et al. .................... | 701/22 |
| 2004/0188905 | A1 * | 9/2004 | Goto et al. ............. | 267/140.15 |
| 2005/0001365 | A1 * | 1/2005 | Kon et al. ............... | 267/140.14 |
| 2005/0184214 | A1 | 8/2005 | Mizushima et al. | |
| 2006/0192329 | A1 * | 8/2006 | Nemoto et al. ......... | 267/140.14 |
| 2007/0013116 | A1 * | 1/2007 | Nemoto et al. ......... | 267/140.14 |
| 2008/0136074 | A1 * | 6/2008 | Nemoto ................. | 267/140.14 |
| 2009/0039577 | A1 * | 2/2009 | Ishiguro et al. ......... | 267/140.13 |
| 2009/0045560 | A1 * | 2/2009 | Fueki et al. ............. | 267/140.15 |

FOREIGN PATENT DOCUMENTS

| | | |
|---|---|---|
| EP | 1 566 564 A1 | 8/2005 |
| JP | 06-137363 | 5/1994 |
| JP | 2000-003181 | 1/2000 |
| JP | 2000-027931 | 1/2000 |
| JP | 2006-017288 (A) | 1/2006 |
| JP | 2007-107579 (A) | 4/2007 |

* cited by examiner

*Primary Examiner*—Christopher P Schwartz
(74) *Attorney, Agent, or Firm*—Carrier, Blackman & Associates, P.C.; William D. Blackman; Joseph P. Carrier

(57) ABSTRACT

An object of the present invention is to provide an active vibration isolating support apparatus to effectively reduce a transient vibration which occurs at the time of engine starting. In order to achieve the above object, an active vibration isolating support apparatus for suppressing a vibration transmitted to a vehicle body including: active mounts to elastically support a load of an engine in the vehicle body each of which includes an actuator; and a control unit to drive the actuator to extend and contract periodically in response to a waveform of the vibration of the engine; in which the control unit supplies a predetermined current to the actuator based on a starting control condition, and starts a control of the actuator based on a control instruction value of a current in response to the vibration of the engine is provided.

12 Claims, 17 Drawing Sheets

AMOUNT OF DISPLACEMENT OF WORKING POINT

AMOUNT OF DISPLACEMENT OF EXCITATION PLATE

DRIVING CURRENT (A)

AMOUNT OF DISPLACEMENT OF WORKING POINT

AMOUNT OF DISPLACEMENT OF EXCITATION PLATE

DRIVING CURRENT (A)

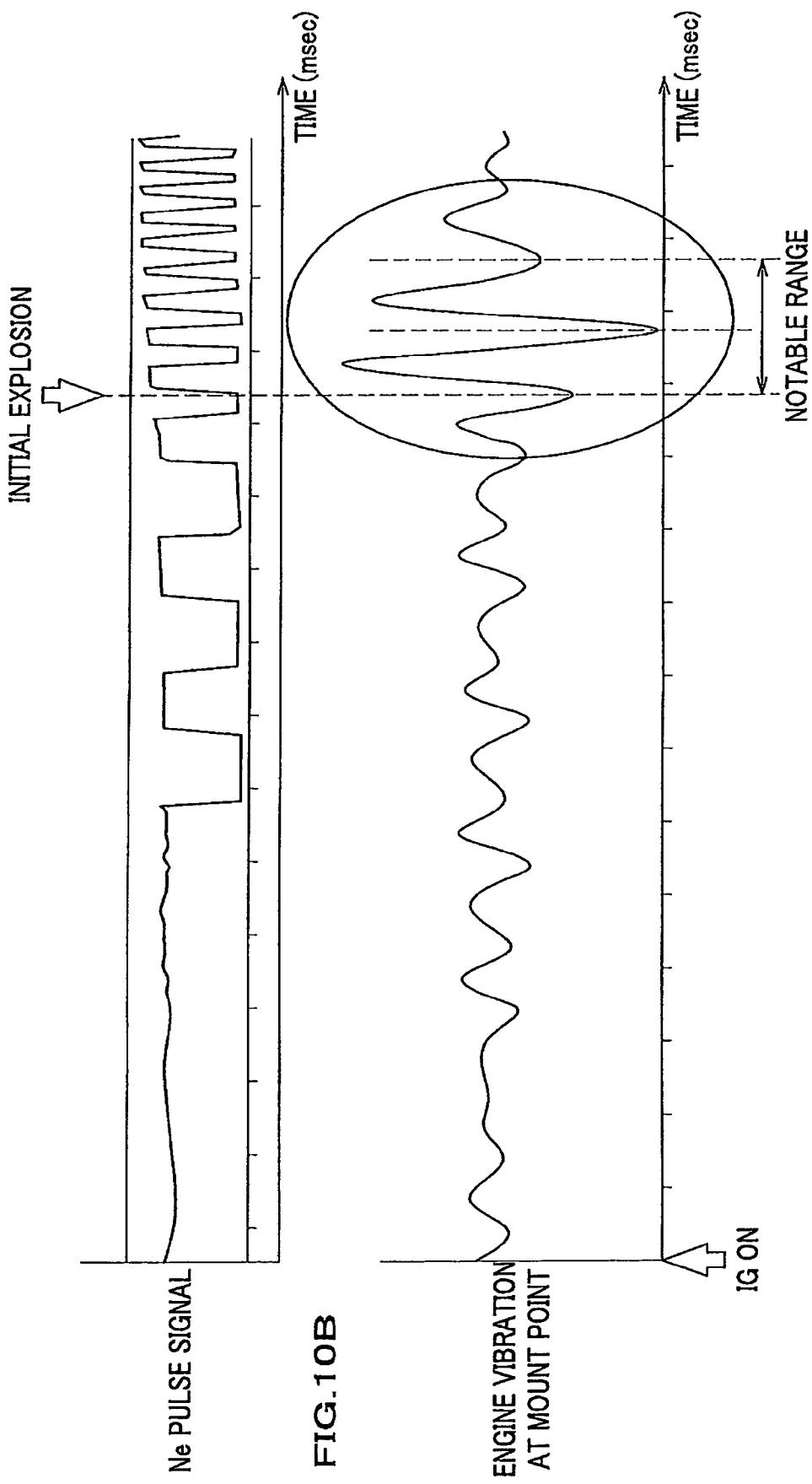

AT THE TIME OF NO VIBRATION

AT THE TIME OF ENGINE VIBRATION

AFTER FILTERING

ACTIVE VIBRATION ISOLATING SUPPORT APPARATUS

CROSS REFERENCE TO RELATED APPLICATIONS

The present application claims benefit of the filing date of Japanese patent application No. 2008-058687 filed on Mar. 7, 2008, the disclosure of which is incorporated herein by reference.

FIELD OF THE INVENTION

The present invention relates to an active vibration isolating support apparatus to elastically support an engine in a vehicle body.

RELATED ART

For example, JP 2007-107579 A ([0022]-[0025]) discloses an active vibration isolating support apparatus for suppressing a vibration transmitted to a vehicle body by driving an actuator of a vibration isolating support unit to extend and contract based on estimation of phase and magnitude of the vibration of the engine using a crank pulse sensor. According to the prior art disclosed in JP 2007-107579 A ([0022]-[0025]), it is possible to sample a crank pulse to estimate the vibration of the engine from variation in crank pulse intervals. Further, based on the result, it is possible to have effective vibration isolating performance to drive an actuator of a vibration isolating support unit to extend and contract for stationary vibrations such as idling state, or constant speed traveling, etc.

However, for short-term vibrations (transient vibrations), it is impossible to reduce transient vibrations by determining the vibration of the engine from variation in crank pulse intervals because controlling is too late. Therefore, for example, JP 2006-017288 A ([0026], and FIG. 6) discloses an active vibration isolating support apparatus having effective vibration isolating performance for transient vibrations when all-cylinder operation is changed to selective-cylinder operation in an engine.

However, JP 2006-017288 A ([0026], and FIG. 6) discloses the apparatus in which changing between the all-cylinder operation and the selective-cylinder operation is detected to transiently correct estimation of vibration of an engine using correction values pre-stored as a map, and the basic idea for the apparatus is that the engine is in the stationary operation. That is, the control is performed at a constant cycle, the result of sampling a crank pulse at the first cycle is used in calculation for control in the next cycle, and the result of the calculation is used to control extension and contraction of an actuator of a vibration isolating support unit in the next cycle. However, the beginning of control of extension and contraction of an actuator of a vibration isolating support unit, which occurs at the time of engine starting, is too late to effectively control the temporary vibration such as a transient vibration.

Particularly, a problem arises that a large vibration of the engine can not be absorbed after the first cylinder is exploded at the time of engine starting because an excitation plate moved by an actuator is positioned at one side of a vertical moving range, and a vertical range in which a working point of the active vibration isolating support apparatus can move is small before the engine starts (i.e., when no power is supplied) as shown in FIG. 12.

Accordingly, it is an object of the present invention to provide an active vibration isolating support apparatus to effectively reduce a transient vibration which occurs at the time of engine starting.

SUMMARY OF THE INVENTION

In order to achieve the above object, in accordance with a first feature of the present invention, there is provided an active vibration isolating support apparatus for suppressing a vibration transmitted to a vehicle body including: active mounts to elastically support a load of an engine in the vehicle body each of which includes an actuator; and a control unit to drive the actuator to extend and contract periodically in response to a waveform of the vibration of the engine; in which the control unit supplies a predetermined current to the actuator based on a starting control condition, and starts a control of the actuator based on a control instruction value of a current in response to the vibration of the engine.

According to the first feature of the present invention, based on the starting control condition of the actuator, for example, the current can be supplied to the actuator during a crankshaft is rotated by a starter before the engine is ignited so that a working point of the active vibration isolating support apparatus is moved to a middle point of a vertical displacement. After that, for example, by starting the control of the actuator based on the control instruction value of the current in response to the vibration of the engine, the working point can be moved in full range of the vertical displacement when the first cylinder is ignited, and the vibration is prevented from being transmitted to the vehicle body from the beginning of self-revolution when the engine is ignited.

In accordance with a second feature of the present invention, there is provided an active vibration isolating support apparatus for suppressing a vibration transmitted to a vehicle body including: active mounts to elastically support a load of an engine in the vehicle body each of which includes an actuator; and a control unit to drive the actuator to extend and contract periodically in response to a waveform of the vibration of the engine so that an excitation plate fixed to the actuator is moved up and down; in which the control unit drives the actuator based on a starting control condition so that the excitation plate is moved to a predetermined position, and starts a control of the actuator based on a control instruction value of a current in response to the vibration of the engine.

According to the second feature of the present invention, based on the starting control condition of the actuator, for example, the excitation plate can be moved to the predetermined position during a crankshaft is rotated by a starter before the engine is ignited so that a working point of an engine mounting unit of the active vibration isolating support apparatus is moved to a middle point of a width of a vertical displacement. After that, for example, by starting the control of the actuator based on the control instruction value of the current in response to the vibration of the engine, the working point can be moved in full range of the vertical displacement when the first cylinder is ignited, and the vibration is prevented from being transmitted to the vehicle body from the beginning of self-revolution when the engine is ignited.

In accordance with a third feature of the present invention, in addition to the first or second feature, the starting control condition is set by beginning the engine starting.

According to the third feature of the present invention, since the starting control condition is set by beginning the engine starting, an enough time is usually provided from the time when the crankshaft is rotated by the starter for engine starting to the time when the first cylinder is ignited. Therefore, it is advantageous for moving the working point of the engine mounting unit to the middle point of the vertical displacement by supplying the predetermined current to the actuator before the beginning of the roll resonance of the engine caused by an ignition of the first cylinder.

For reference's sake, provided that the starting control condition means that an ignition switch of the vehicle is turned to an "ON" position and an ignition switch signal is detected, that does not mean the beginning of the engine starting. Therefore, a predetermined constant current is supplied to the actuator of the active vibration isolating support apparatus continuously, and an electric power may be lost. However, according to the present invention, such a situation can be prevented.

In accordance with a fourth feature of the present invention, in addition to the third feature, a control of the control instruction value of the current in response to the subsequent vibration of the engine is started based on a position of an initially exploded cylinder determined by at least a crank angle at the time when the engine begins to rotate.

According to the fourth feature of the present invention, since the control of the control instruction value of the current in response to the subsequent vibration of the engine is started based on a position of an initially exploded cylinder determined by at least a crank angle at the time when the engine begins to rotate, in response to a timing of detection of the crank angle of the initially exploded cylinder, a pushing action and a pulling action of the active vibration isolating support apparatus to the working point of the engine can be started.

In accordance with a fifth feature of the present invention, in addition to any one of the first to fourth feature, the actuator is a linear solenoid.

According to the fifth feature of the present invention, since the actuator is the linear solenoid, it can decrease a delay in a rising time of current in the solenoid. As a result, the working point of the active vibration isolating support apparatus can stabilizes soon.

In accordance with a sixth feature of the present invention, in addition to the fourth feature, the control instruction value of the current in response to the subsequent vibration of the engine is based on a frequency of a roll resonance obtained at the time when the engine is stopped.

According to the sixth feature of the present invention, since the control instruction value of the current in response to the subsequent vibration of the engine is based on the frequency of the roll resonance obtained at the time when the engine is stopped, when a time-dependent change in a frequency of the vibration caused by the roll resonance of the engine, it is possible to suppress a transmission of the roll resonance to the vehicle body at the time of engine starting.

BRIEF DESCRIPTION OF THE DRAWINGS

The object and features of the present invention will become more readily apparent from the following detailed description taken in conjunction with the accompanying drawings in which:

FIG. 10A shows a pulse signal indicating the engine revolution speed Ne;

FIG. 10B shows a curve indicating an engine vibration (load (N)) acting on a mount point when a general engine mount which is not the active vibration isolating support apparatus is used;

DESCRIPTION OF PREFERRED EMBODIMENTS

Hereinafter, with reference to FIGS. 1-17, preferred embodiments of the present invention will be described.

(Whole Structure of the Active Vibration Isolating Support Apparatus)

Figure 1A:
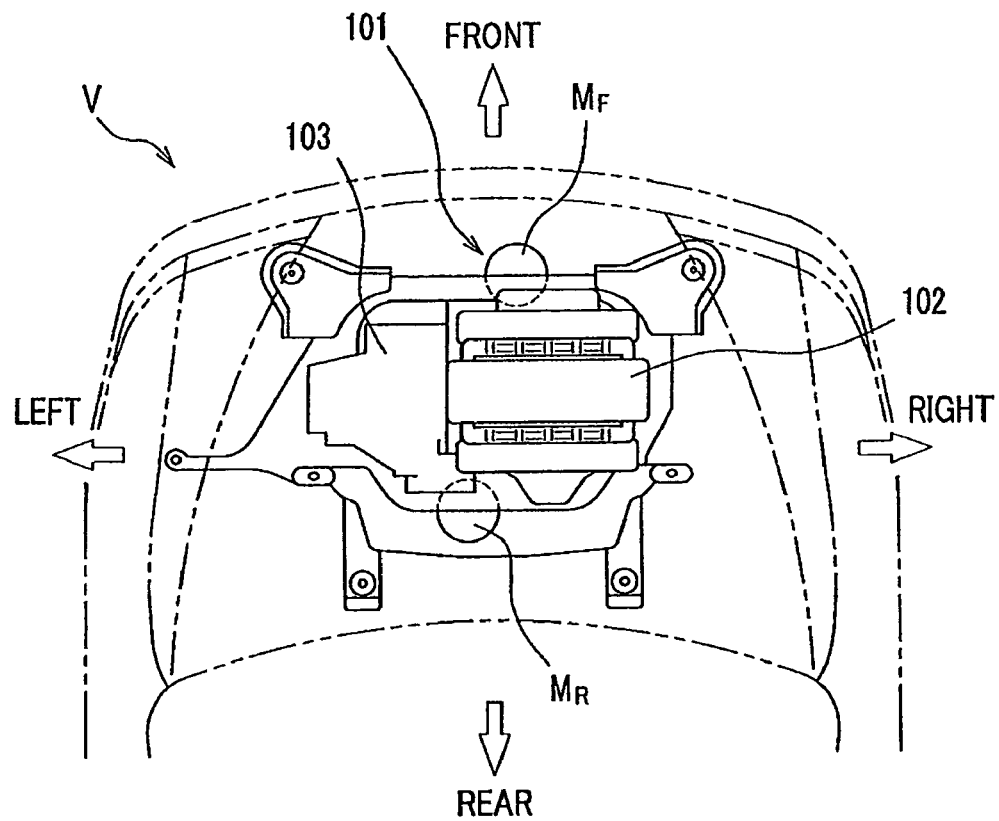
FIG. 1A is a plan view showing an engine mounting in a vehicle to which an active vibration isolating support apparatus according to an embodiment of the present invention is applied.
Figure 1B:
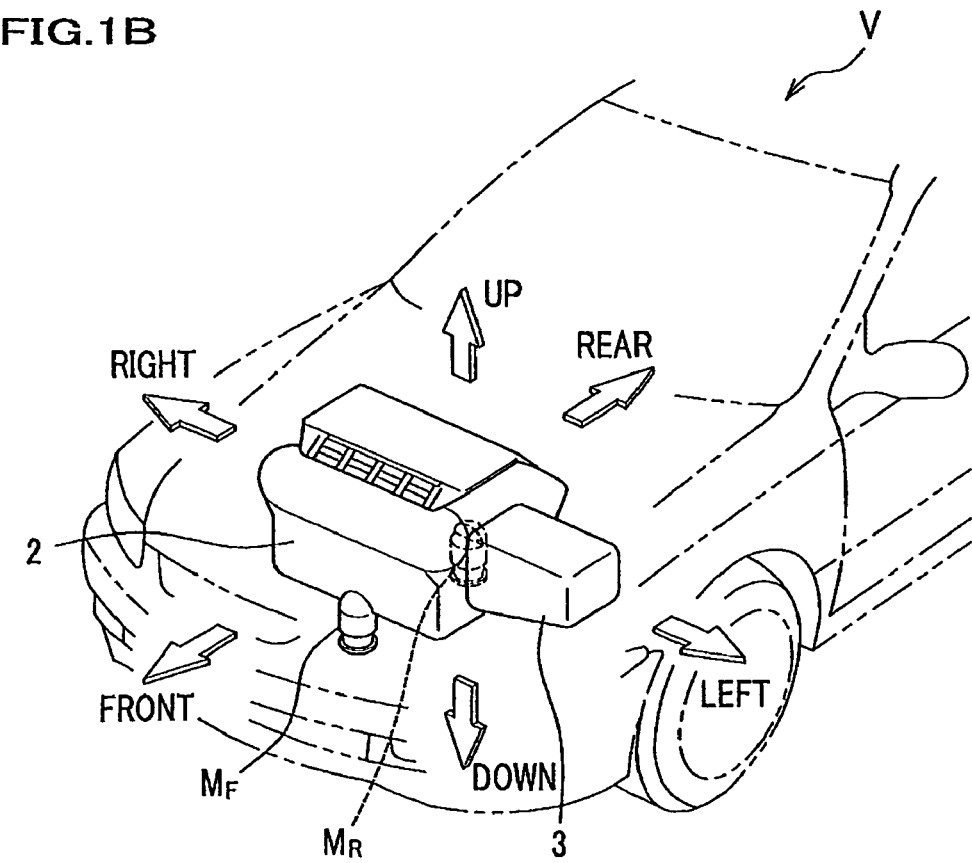
FIG. 1B is a perspective view showing the engine mounting in the vehicle to which the active vibration isolating support apparatus according to the embodiment is applied.
Figure 2:
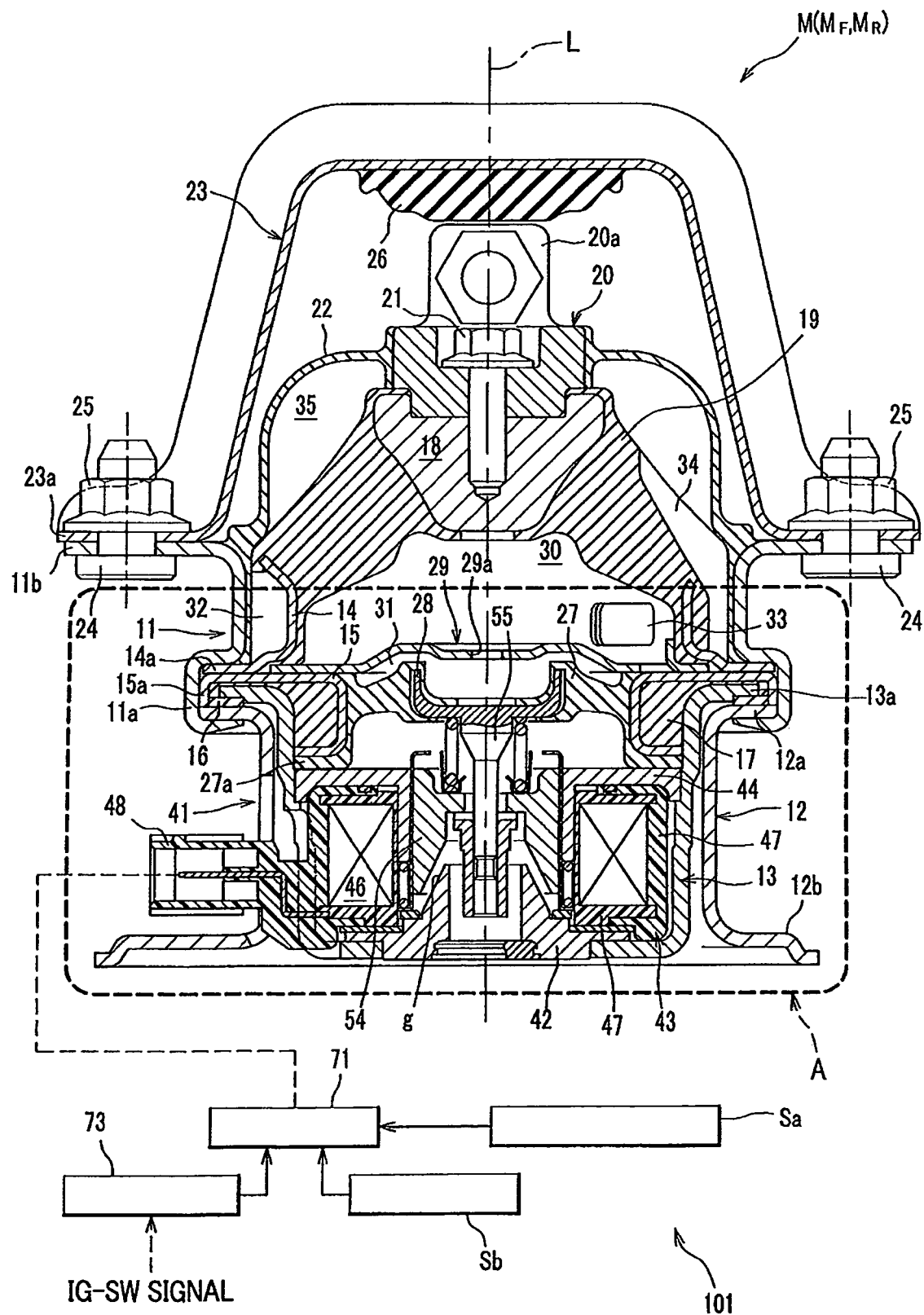
FIG. 2 is a longitudinal cross sectional view showing a structure of an active mount of an active vibration isolating support apparatus according to the embodiment.
Figure 3:
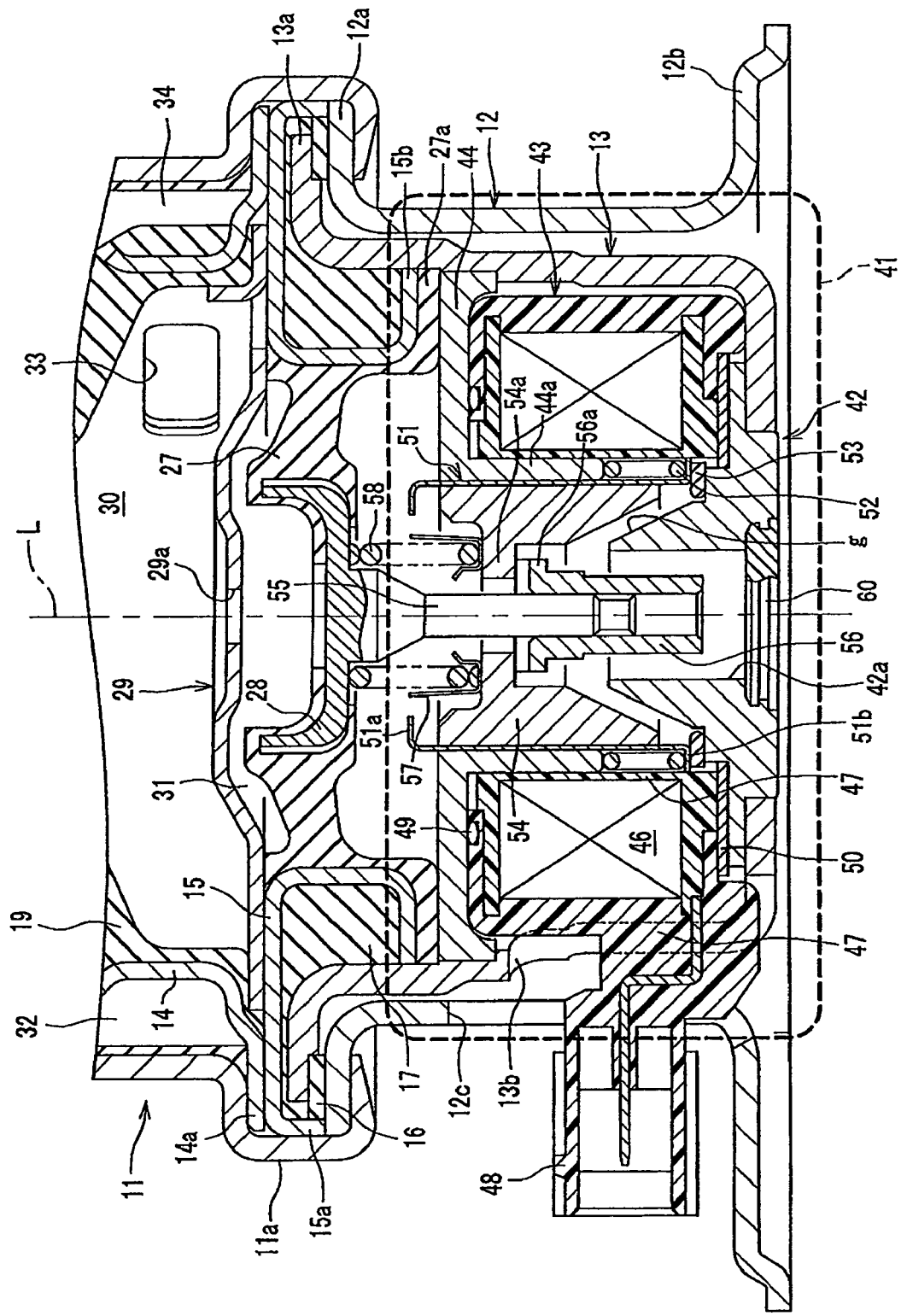
FIG. 3 is an enlarged view of the portion A in FIG. 2.

FIG. 1A is a plan view showing the engine mounting state in a vehicle to which the active vibration isolating support apparatus according to the embodiment of the present invention is applied, and FIG. 1B is a perspective view showing the same. FIG. 2 is a longitudinal sectional view showing the structure of the active control mount of the active vibration isolating support apparatus according to the embodiment. FIG. 3 is an enlarged view of the portion A in FIG. 2.

In FIG. 1A and FIG. 1B, the active vibration isolating support apparatus 101 according to the present invention can be driven to extend and contract in vertical direction, and includes active control mounts (active mounts) M ($M_F$, and $M_R$ in FIG. 1) which are used to elastically support an engine 102 of a vehicle V in a vehicle body frame, and are disposed ahead of and behind the engine 102.

Hereinafter, "active mounts $M_F$ and $M_R$" are referred to as an "active mount M" when it is not necessary to distinguish between the engine mounts $M_F$ and the engine mounts $M_R$.

Here, the engine 102 is a so-called side-ways mounted transversal V engine with six-cylinders in which one end of a crankshaft (not shown) is connected to a transmission 103, and the crankshaft is disposed in a direction transverse to a body of the vehicle V. Therefore, the engine 102 is disposed in a direction so as to the crankshaft is disposed in a direction transverse to a body of the vehicle V, and the vibration isolating support units $M_F$ and $M_R$ are disposed ahead of and behind the engine 102 as a pair to reduce a roll vibration.

The active mounts $M_F$ and $M_R$ are mounted on a location below the center of gravity of the engine 102 to reduce the roll vibration in a front-rear direction of the engine 102, and to elastically support the engine 102 in the vehicle body of the vehicle V.

As shown in FIG. 2, the active vibration isolating support apparatus 101 includes an active control mount ECU (electronic control unit) 71 to control the active mounts M (in FIG. 2, only one active mount M is shown). Hereinafter, the active control mount ECU 71 is referred to as an "ACM (Active Mount Control) ECU 71".

The ACMECU 71 is connected to an engine control ECU 73 (hereinafter, referred to as an "engine ECU 73") to control revolution speed Ne or output torque, etc. of the engine via a communication line such as CAN (Controller Area Network).

Further, the ACMECU 71 receives an engine revolution speed (Ne) signal, crank pulse signals, TDC (Top Dead Center) signals to exhibit timing of the top dead centre for each cylinder, a cylinder-off signal to exhibit either all-cylinder operation or selective-cylinder operation the V engine with six-cylinders 102 is in, and an ignition switch signal (hereinafter, referred to as an "IG-SW signal") to exhibit the engine starting from the engine ECU 73 via the communication line.

For reference's sake, in the case of the six-cylinder engine, the crank pulse is output 24 times per revolution of the crankshaft, that is, once every 15 degrees of crank angle.

(Structure of the ACM)

As shown in FIG. 2, an active mount M has a structure that is substantially symmetrical with respect to an axis L, and includes a substantially cylindrical upper housing 11, a substantially cylindrical lower housing 12 disposed below the housing 11, an upwardly opening substantially cup-shaped actuator case 13 housed in the lower housing 12, a diaphragm 22 connected on the upper housing 11, an annular first elastic body support ring 14 housed in the upper housing 11, a first elastic body 19 connected on the first elastic body support ring 14, an annular second elastic body support ring 15 housed in the actuator case 13, a second elastic body 27 connected to an inner peripheral side of the second elastic body support ring 15, and a driving unit (actuator) 41 housed in the actuator case 13 and disposed below the second elastic body support ring 15 and the second elastic body 27.

Between a flange unit 11a at the lower end of the upper housing 11 and a flange unit 12a at the upper end of the lower housing 12, a flange unit 13a on the outer periphery of the actuator case 13, an outer peripheral unit 14a of the first elastic body support ring 14, and an upper and outer peripheral unit 15a of an annular and substantially horseshoe cross section second elastic body support ring 15 disposed on upper side in the actuator case 13 are superimposed and joined by crimping. In this process, an annular first floating rubber 16 is disposed between the flange unit 12a and the flange unit 13a, and an annular second floating rubber 17 is disposed between an upper side of the flange unit 13a and lower side of the upper and outer peripheral unit 15a, so that the actuator case 13 is floatingly supported such that it can move up and down relative to the upper housing 11 and the lower housing 12.

The first elastic body support ring 14, and a first elastic body support boss 18 disposed in a concave unit provided on the upper side of a first elastic body 19 are joined by vulcanization bonding at the lower and upper ends of the first elastic body 19 made of a thick rubber. Further, a diaphragm support boss 20 is fixed to an upper face of the first elastic body support boss 18 by a bolt 21. An outer peripheral unit of a diaphragm 22 whose inner peripheral unit is joined by vulcanization bonding to the diaphragm support boss 20, is joined by vulcanization bonding to the upper housing 11.

An engine mounting unit 20a (a working point) integrally formed with an upper face of the diaphragm support boss 20 is fixed to the engine 102 (see FIG. 1). (Detailed method for fixing is not shown.) Also, a vehicle body mounting unit 12b at the lower end of the lower housing 12 is fixed to the vehicle body frame (not shown).

A flange unit 23a at the lower end of a stopper member 23 is joined to a flange unit 11b by bolts 24 and nuts 25 at the upper end of the upper housing 11. The engine mounting unit 20a provided on the diaphragm support boss 20 faces a stopper rubber 26 attached to an upper inner face of the stopper member 23 so that the engine mounting unit 20a can touch the stopper rubber 26.

By such a structure, when a large load is input from the engine 102 (see FIG. 1) to the active mount M, the engine mounting unit 20a touches the stopper rubber 26, thereby reducing excessive displacement of the engine 102.

An outer peripheral unit of a second elastic body 27 made of a membranous rubber is joined to the inner peripheral face of the second elastic body support ring 15 by vulcanization bonding. At a center portion of the second elastic body 27, a movable member 28 is joined by vulcanization bonding so that the upper unit thereof is embedded in.

And, disc-shaped partition member 29 is fixed between an upper face of the second elastic body support ring 15 and the lower unit of the first elastic body support ring 14. A first liquid chamber 30 defined by the first elastic body support ring 14, the first elastic body 19, and the partition member 29, and a second liquid chamber 31 defined by the partition member 29 and the second elastic body 27, communicate with each other via a through hole 29a formed in the center of the partition member 29.

the outer peripheral unit 27a of the second elastic body 27 is held between a lower and outer peripheral unit 15b of the second elastic body support ring 15 (see FIG. 3) and a yoke 44 described below to function as a seal.

Also, an annular through passage 32 is formed between the first elastic body support ring 14 and the upper housing 11. The through passage 32 communicates with the first liquid chamber 30 via a through hole 33, and communicates via a through gap 34 with a third liquid chamber 35 defined by the first elastic body 19 and the diaphragm 22.

Next, with reference to FIG. 3, the structure of a driving unit (actuator) 41 (illustrated by the phantom lines) housed in the actuator case 13 will be explained.

As shown in FIG. 3, the driving unit 41 mainly includes a stationary core 42 made of metal or alloy having high magnetic permeability, a coil assembly 43, a yoke 44, and a movable core 54, etc.

The stationary core 42 has substantially cylindrical configuration, and has a flange for receiving washer at its lower end. The outer circumference of the cylindrical unit has conical configuration. The movable core 54 has substantially cylindrical configuration. The upper end of the movable core 54 projects in the inner peripheral direction to form a spring washer 54a. The inner circumference of the cylindrical unit below the spring washer 54a has conical configuration.

The coil assembly 43 includes a cylindrical coil 46 disposed between the stationary core 42 and the yoke 44, and a coil cover 47 covering the outer periphery of the coil 46. The coil cover 47 is integrally formed with a connector 48 running through openings 13b and 12c formed in the actuator case 13 and the lower housing 12 and extending outward, and an electric supply line is connected to the connector 48 to supply electric power to the coil 46.

The yoke 44 has an annular flange on the upper side of the coil cover 47, and has a cylindrical unit extending from the inner peripheral unit of the flange downward. The yoke 44 has, as it were, a configuration of cylinder having flange. A seal 49 is disposed between an upper face of the coil cover 47 and a lower face of the annular flange of the yoke 44. A seal 50 is disposed between a lower face of the coil cover 47 and an upper face of the stationary core 42. These seals 49 and 50 can prevent water or dust from entering an internal space of the driving unit 41 via the openings 13b and 12c formed in the actuator case 13 and the lower housing 12.

A thin cylindrical bearing member 51 is fitted, in a vertically slidable manner, into an inner peripheral face of a cylindrical unit 44a of the yoke 44. An upper flange 51a and a lower flange 51b are formed at the upper end and the lower end respectively of the bearing member 51, the upper flange 51a being bent radially inward, the lower flange 51b being bent radially outward.

A set spring 52 is disposed in a compressed state between the lower flange 51b and the lower end of the cylindrical unit 44a of the yoke 44. The bearing member 51 is supported by the yoke 44 by the lower flange 51b being pressed against the upper face of the stationary core 42 via an elastic body 53 disposed between the lower face of the lower flange 51b and the stationary core 42 by means of an elastic force of the set spring 52.

A substantially cylindrical movable core 54 is fitted, in a vertically slidable manner, into an inner peripheral face of the bearing member 51. Further, the stationary core 42 and the movable core 54 have hollow center portions on the axis L respectively, and a substantially cylindrical rod 55, which connects to the center of the movable member 28 (on the axis L) and extends downwardly, is disposed there. A nut 56 is tightened around the lower end of the rod 55. The nut 56 has a hollow unit at its center, the upper end of the hollow unit opens upward, and receives the lower end of the rod 55 in the hollow unit. An upper end 56a of the nut 56 has a slightly larger outer diameter than that of its lower portion. An upper face of the upper end 56a touches the lower face of the spring washer 54a.

Also, a set spring 58 is disposed in a compressed state between the spring washer 54a of the movable core 54 and a lower face of the movable member 28. The lower face of the spring washer 54a of the movable core 54 is fixed by being pressed against the upper end 56a of the nut 56 by means of an elastic force of the set spring 58. In this state, the conical inner peripheral unit of the cylindrical unit of the movable core 54 and the conical outer peripheral unit of the stationary core 42 face each other across a conical air gap g.

Relative to the rod 55, the nut 56 is tightened in an opening 42a formed in the center of the stationary core 42 with position adjustment in vertical direction. This opening 42a is blocked by a rubber cup 60.

The operation of the active mount M configured as described above will be explained (hereinafter, see FIGS. 1-3 if necessary).

The ACMECU 71 is connected to crank pulse sensors Sa (see FIG. 2) to detect crank pulses which are output 24 times per revolution of the crankshaft, that is, once every 15 degrees of crank angle associated with rotation of the crankshaft (not shown) in the engine 102 (see FIG. 1), and cam angle sensors Sb to output the TDC signal which is output 3 times per revolution of the crankshaft, that is, every top dead centre of each of the cylinder. The ACMECU 71 estimates vibrational state of the engine based on the crank pulses from the crank pulse sensors Sa and the TDC signal from the cam angle sensors Sb so as to control power supply to a driving unit 41 (actuator 41) of the active mounts $M_F$ and $M_R$ of the active vibration isolating support unit 101 (see FIG. 1).

A coil 46 of the driving unit 41 is excited by power supply control from the ACMECU 71 so as to move a movable core 54 by sucking force to move a movable member 28 downwardly. Associated with movement of this movable member 28, a second elastic body 27 to define a second liquid chamber 31 is moved downwardly so as to increase the capacity of the second liquid chamber 31. Conversely, when the coil 46 is demagnetized, the second elastic body 27 is deformed upwardly by elastic deformation of itself, the movable member 28 and the movable core 54 move upwardly, and the capacity of the second liquid chamber 31 decreases.

However, the engine shake vibration is caused by a resonance between the vehicle body and the engine system in a coupled system including the engine, the vehicle body, and a suspension. When low frequency (for example, 7-20 Hz) engine shake vibration occurs while the vehicle V is traveling, the first elastic body 19 is deformed by a load input from the engine 102 via the diaphragm support boss 20 and the first elastic body support boss 18, thus changing the capacity of the first liquid chamber 30, so that a liquid moves to and fro between the first liquid chamber 30 and the third liquid chamber 35 via the through passage 32. In this state, when the capacity of the first liquid chamber 30 increases/decreases, the capacity of the third liquid chamber 35 decreases/increases correspondingly, and this change in the capacity of the third liquid chamber 35 is absorbed by elastic deformation of the diaphragm 22. At this time, the shape and the dimensions of the through passage 32 and the spring constant of the first elastic body 19 are set so that a low spring constant and high attenuation force are exhibited in the frequency region of the engine shake vibration. Therefore, it is possible to effectively reduce the vibration transmitted from the engine 102 to the vehicle body frame.

Further, in the frequency region of the engine shake vibration, when the engine 102 is in a steady rotating state, the driving unit 41 is maintained in a non-operating state.

When there is vibration having a higher frequency than that of the above-mentioned engine shake vibration, that is, vibration during idling or vibration during selective-cylinder operation due to rotation of crankshaft (not shown) of the engine 102, the liquid within the through passage 32 providing communication between the first liquid chamber 30 and the third liquid chamber 35 becomes stationary and a vibration isolating function cannot be exhibited; the driving units 41 of the active mounts $M_F$ and $M_R$ are therefore driven to exhibit a vibration isolating function.

For reference's sake, the idle vibration is caused by low-frequency vibrations of a floor, seats, and a steering wheel during idling. For example, BURUBURU vibration is caused in a four-cylinder engine in a range of 20-35 Hz, and in a six-cylinder engine in a range of 30-50 Hz, and YUSAYUSA vibration is caused in a range of 5-10 Hz by uneven combustion, and is a main factor of roll vibration in engine.

Therefore, in order to drive the driving unit 41, the active vibration isolating support apparatus 101 (see FIG. 1) including the active mounts $M_F$ and $M_R$ shown in FIG. 2 controls the power supplied to the coils 46 based on signals from a crank pulse sensor Sa, a cam angle sensor Sb, and an engine ECU 73.

(Structure of the ACMECU)

Next, with reference to FIGS. 1-4, the structure of the ACMECU will be explained.

Figure 4:
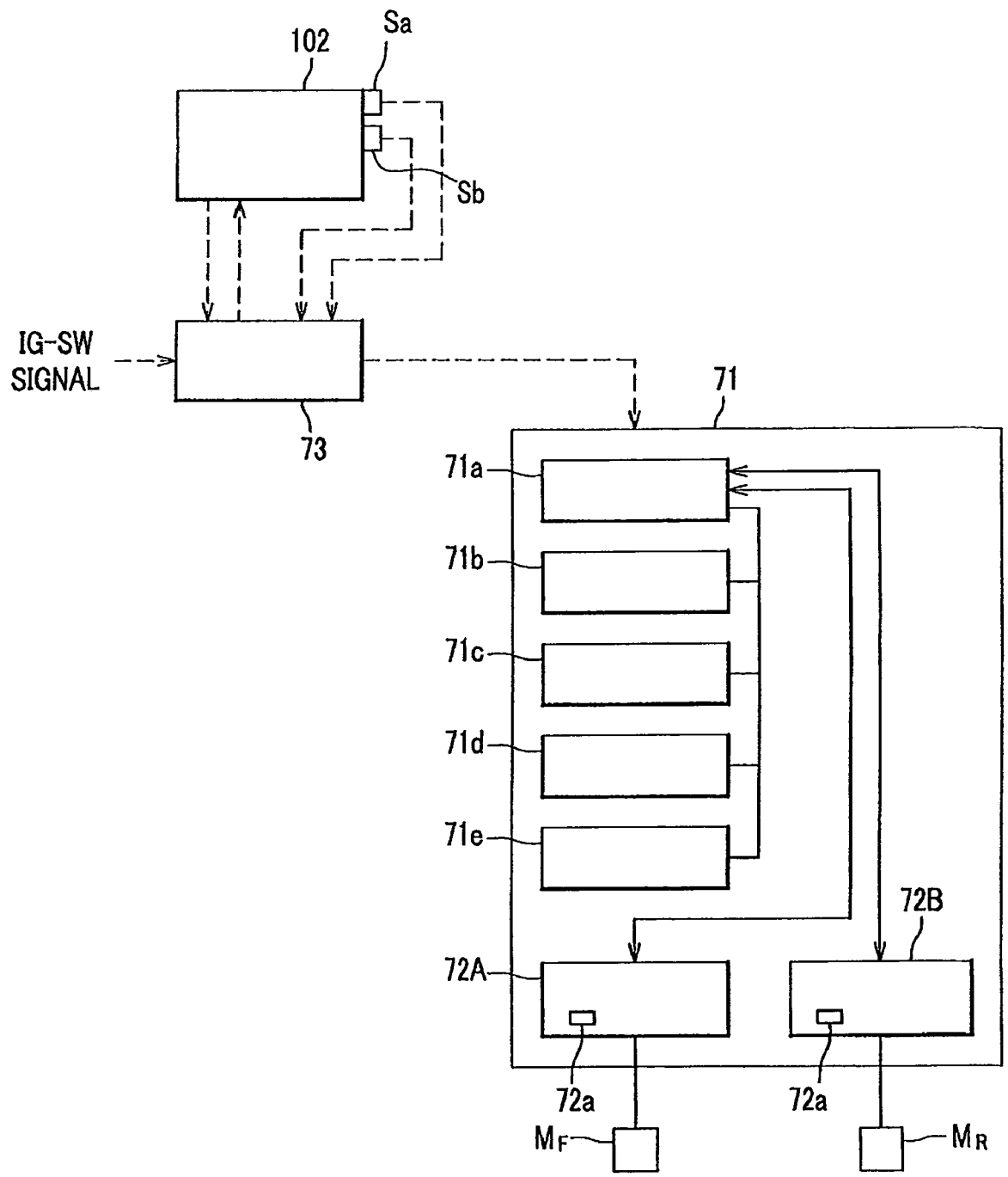
FIG. 4 is a block diagram showing the interconnection among a crank pulse sensor, a cam angle sensor, and an engine ECU.

FIG. 4 is a block diagram showing the interconnection among a crank pulse sensor, a cam angle sensor, and an engine ECU.

The crank pulse sensor Sa detects a crank pulse generated by a crankshaft (not shown) of the engine 102. In the case of a six-cylinder engine, the crank pulse is generated every 15 degrees of crank angle in the engine 102, and the crank pulse sensor Sa detects this crank pulse to send it to the engine ECU 73. The cam angle sensor Sb outputs the TDC signal which is output 3 times per revolution of the crankshaft, that is, every top dead centre of each of the cylinder.

The engine ECU 73 is composed of a microcomputer having CPU (Central Processing Unit) (not shown), ROM (Read Only Memory), RAM (Random Access Memory), etc., and peripheral circuitry so as to control revolution speed Ne of the engine 102, and to detect revolution speed Ne of the engine 102 via a revolution speed sensor (not shown) being provided with the engine 102. The engine ECU 73 also has the ability to send the detected revolution speed Ne and the crank pulse from the crank pulse sensor Sa, and the cam angle sensor Sb to the ACMECU 71 via the communication line.

Further, when the engine 102 is started by an electric motor (not shown), which is incorporated in the engine 102 and is referred to as a starter, using the IG-SW signal, the engine ECU 73 determines which cylinder should be a first exploded cylinder (hereinafter, referred to as an "initially exploded cylinder") at the time of a first explosion (hereinafter, referred to as an "initial explosion") of the engine 102 based on the crank pulse signals and the TDC signal. To the initially exploded cylinder, the engine ECU 73 controls a fuel injection to be done first. On this occasion, the cylinder to which the fuel injection is done first is referred to as an "initially injected cylinder".

The engine ECU 73 outputs a signal to specify the initially injected cylinder to the ACMECU 71 via the communication line provided in the vehicle V.

The ACMECU 71 is composed of a microcomputer having CPU 71b, ROM 71c, RAM 71d, a storage device 71e such as a nonvolatile memory, a peripheral circuitry such as a signal input/output part 71a, and power supply parts 72A and 72B, etc.

The signal input/output part 71a receives an engine revolution speed (Ne) signal, crank pulse signals, TDC signals, and a signal to specify the initially injected cylinder, etc. from the engine ECU 73, and sends the above signals to the CPU 71b. Also, the signal input/output part 71a receives a power supply control signal to control the driving unit 41 of the active mounts $M_F$ and $M_R$ from the CPU 71b, and sends the signal to the power supply parts 72A and 72B.

The power supply part 72A includes a switching circuit (not shown) to supply current to the coil 46 (see FIG. 3) provided in the active mount $M_F$, and a current sensor (not shown) to detect current flowing through the coil 46 in reality. The switching circuit of the power supply part 72A is controlled by the CPU 71b, and the power supply part 72A supplies DC-current from a battery to the coil 46 via the connector 48 (see FIG. 3). The power supply part 72B has a similar structure.

And, the CPU 71b is operated in accordance with a computer program stored in the ROM 71c. Also, the storage device 71e stores necessary data to control the active mounts $M_F$ and $M_R$, etc.

In the driving unit 41 of the active mount M configured as shown in FIG. 3, when current does not flow through the coil 46, a movable member 28 is moved upwardly by elastic restorative force of a second elastic body 27. Also, a nut member 25 pushes a movable core 54 up to form a gap g between the movable core 54 and the stationary core 42.

On the other hand, when current is supplied from the ACMECU 71 to the coil 46, magnetic flux lines generated by the coil 46 pass through the yoke 44, the movable core 54, and the gap g in up and down direction to form a closed circuit fed back to the stationary core 42 and the coil 46, thereby moving the movable core 54 downwardly by sucking force. At this time, the movable core 54 moves the movable member 28 downwardly via the nut member 25 fixed to the rod 55 of the movable member 28 so as to deform the second elastic body 27 downwardly. As a result, since the capacity of the second liquid chamber 31 (see FIG. 2) increases, a liquid in the first liquid chamber 30 compressed by load from the engine 102 (see FIG. 1) flows into the second liquid chamber 31 through the through hole 29a of the partition member 29 to reduce load transmitted from the engine 102 to the vehicle V (see FIG. 1).

Conversely, when supplying current to the coil 46 is stopped, the movable core 54 is released from the downward sucking force, the second elastic body 27 is deformed upwardly by elastic deformation of itself, and the movable core 54 is pulled up via the nut 56 fixed to the rod 55 and is moved upwardly. As a result, a gap g is formed. At this time, second elastic body 27 is moved upwardly. As a result, since the capacity of the second liquid chamber 31 decreases, a liquid in the first liquid chamber 30 compressed by load from the engine 102 flows into the second liquid chamber 31 through the through hole 29a of the partition member 29 to reduce load transmitted from the engine 102 to the vehicle V.

As described above, the ACMECU 71 can control vertical motion of the movable member 28 by controlling the current supplied to the coil 46 so as not to transmit the roll vibration of the engine 102 to the vehicle body frame.

(Vibration Isolating Function During Normal Operation)

Next, with reference to FIGS. 4-6, a control flow of the active vibration isolating support apparatus 101 during normal operation (except starting and stopping of engine 102) will be explained.

This control is performed by executing a computer program stored in the ROM 71c.

Figure 5:
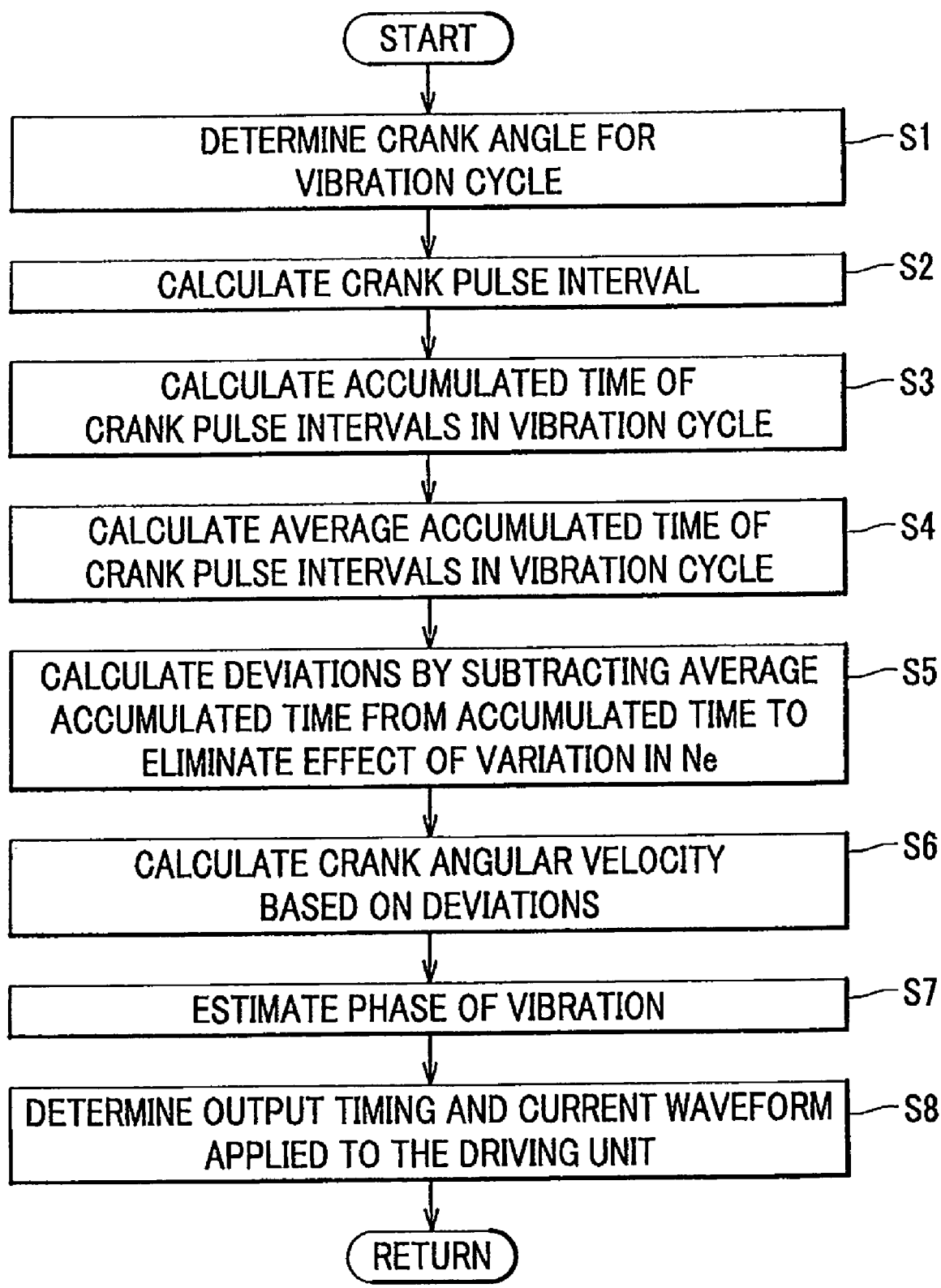
FIG. 5 is a flowchart showing a control flow of the active vibration isolating support apparatus during normal operation.
Figure 6:
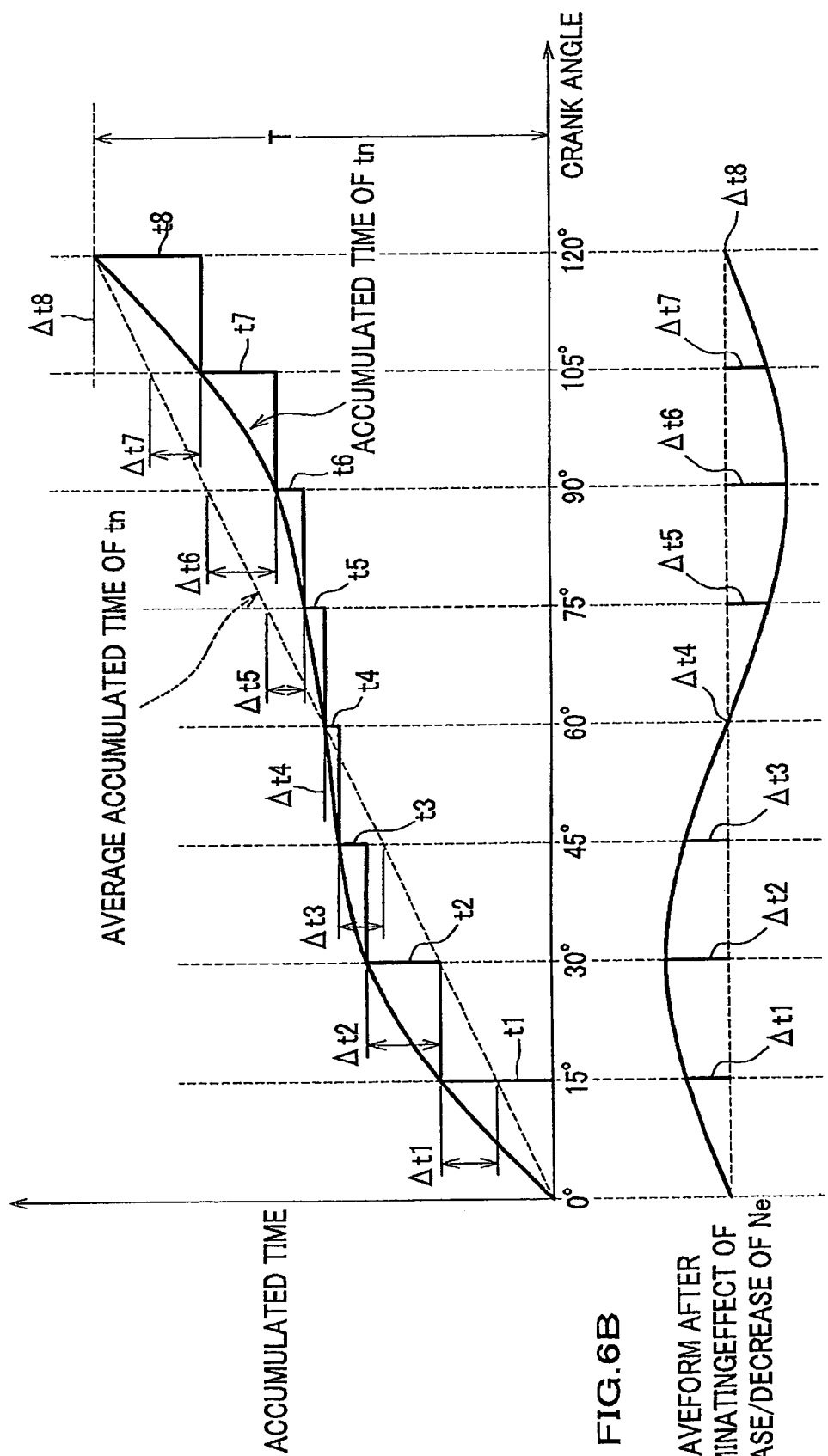
FIG. 6A shows an accumulated time and an average accumulated time of a crank pulse interval tn.
FIG. 6B shows a deviation Δtn caused by only engine vibration (i.e., effect of variation in engine revolution speed Ne is excluded)

FIG. 5 is a flowchart showing a control flow of the active vibration isolating support apparatus; and FIG. 6 is an explanatory diagram of step 5 in the flowchart in FIG. 5. FIG. 6A shows an accumulated time and an average accumulated time of a crank pulse interval tn, and FIG. 6B shows a deviation Δtn caused by only engine vibration (i.e., effect of variation in engine revolution speed Ne is excluded).

In CPU 71b (see FIG. 4), in advance, based on information from the engine ECU 73 (see FIG. 4), it is determined whether the engine 102 (see FIG. 4) is in a selective-cylinder operation state in which selective-cylinders are in operation, or an all-cylinder operation state in which all cylinders are in operation. At the time of all-cylinder operation, since 6 times explosions occurs per two revolutions of the crankshaft, the crank angle for that vibration cycle is 120 degrees. In this vibration cycle, eight of crank pulses are output every 15 degrees of crank angle. Also, when the cylinders which are on one side bank are made to be non-operational, 3 times explosion occurs per two revolutions of the crankshaft, and the crank angle for that vibration cycle is 240 degrees. In this vibration cycle, sixteen of crank pulses are output.

For example, if the engine 102 is determined that it is in the all-cylinder operation state, the crank angle for the vibration cycle T (in this case, 120 degrees) is determined first in step S1. In next step S2, eight of crank pulses in the vibration cycle T are read so as to calculate a crank pulse interval. As shown in FIG. 6A, eight of crank pulses are output in the vibration cycle T, and crank pulse interval tn (t1, t2, t3, . . . , t8) of those varies depending on vibration in angular velocity of the crankshaft.

That is, a crank angular velocity ω increases and the crank pulse interval tn decreases in explosion stroke of the engine 120, and the crank angular velocity ω decreases and the crank pulse interval tn increases in compression stroke of the engine 102. Otherwise, in the stroke in which the engine revolution speed Ne increases, the crank angular velocity ω increases and the crank pulse interval tn decreases. In the stroke in which the engine revolution speed Ne decreases, the crank angular velocity ω decreases and the crank pulse interval tn increases. Therefore, the crank pulse interval tn shown in FIG. 6A includes one factor caused by variation in crank angular velocity ω associated with vibration in each vibration cycle T of engine 102, and other factor caused by variation in crank angular velocity ω associated with increase/decrease in the engine revolution speed Ne.

The factor which has effect on controlling of the active vibration isolating support unit 101 in the above two factors is the former factor (variation in crank angular velocity ω associated with vibration), and the latter factor which has no effect on controlling of the active vibration isolating support unit 101 (variation in crank angular velocity ω associated with increase/decrease in engine revolution speed Ne) should be excluded.

In next step S3, an accumulated time Σtn=t1+t2+t3+ . . . +t8 of eight of crank pulse intervals tn of crank pulse is calculated. This accumulated time Σtn corresponds to the vibration cycle T.

In next step S4, an average accumulated time of the eight of crank pulse intervals tn is calculated. As will be appreciated from FIG. 6, although the line of the accumulated time curves in S-shape, the line of the average accumulated time is a straight-line connecting a starting point and an ending point of the line of the accumulated time. That is, the average accumulated time corresponds to the accumulated time when the crank angular velocity ω is constant, and the value thereof increases by T/8 every 15 degrees of crank angle.

In next step S5, eight of deviations Δt1, Δt2, Δt3, . . . , Δt8 are calculated by subtracting the average accumulated time from the accumulated time every 15 degrees of crank angle. The line curving in S-shape in FIG. 6B represents deviations Δtn, and this line corresponds a variation waveform of the crank pulse interval tn after eliminating effect of variation in the engine revolution speed Ne, that is, corresponds to a deviance for the crank pulse interval tn when crank angular velocity ω is constant.

Provided that there is no engine vibration, if the engine revolution speed Ne is constant, the accumulated time of the crank pulse interval tn increases linearly like the average accumulated time, if the engine revolution speed Ne increases/decreases, the accumulated time of the crank pulse interval tn deviates from the liner average accumulated time. However, in this embodiment, in practice, a liner average accumulated time obtained by averaging the varying engine revolution speed Ne is used as a reference, a deviation Δtn from the average accumulated time is calculated, and deviation Δtn caused by only engine vibration (i.e., effect of variation in engine revolution speed Ne is excluded) can be obtained. This means that deviation of real angular velocity for average angular velocity of the crankshaft is obtained.

In next step S6, a maximal value and a minimum value of the deviation Δtn are determined, and based on the deviation of the maximal value and the minimum value, a variation VAPP in the crank angular velocity ω is calculated. In step S7, based on an output timing of the TDC signal from the cam angle sensor Sb and time n until the minimum value, a phase of vibration is estimated. Next, in step S8, based on a map of the variation VAPP prestored in the ROM 71c and the engine revolution speed Ne, magnitude of vibration is calculated so as to determine output timing and current waveform applied to the driving unit 41.

Further, when it is determined that the engine 102 is in the selective-cylinder operation state, sixteen of crank pulses in the vibration cycle T are read so as to determine current waveform applied to the driving unit 41 and output timing in the same way as that of the all-cylinder operation state.

As described above, when the engine 102 vibrates, it is possible to exhibit a vibration isolating function to reduce propagation of the vibration of the engine 102 to the vehicle body frame by making the active vibration isolating support unit 101 to extend and contract so as to follow the roll vibration of the engine 102 depending on the magnitude and phase of the vibration.

(Vibration Isolating Support Control to a Roll Resonance at the Time of Engine Starting)

Meanwhile, in the engine 102, an explosion of a fuel-air mixture in a combustion chamber generates force to push down a piston, and the force is converted to a rotary motion of the crankshaft via a connecting rod. As a result, a roll moment around the crankshaft acts on the engine 102 as a reaction of a rotation of the crankshaft. Since a variation frequency of this roll moment changes depending on the engine revolution speed, when the variation frequency of the roll moment matches the roll resonance frequency of the engine 102 at specific engine revolution speed, a vehicle vibration which is uncomfortable for an occupant is generated.

Generally, since the roll resonance frequency is lower than a vibration frequency at the engine revolution speed Ne (which is equal to or higher than an idling revolution speed) in a normal operating region of the engine 102, when the engine revolution speed Ne is lower than the idling revolution speed at the time of starting and stopping of the engine 102, the roll resonance of the engine 102 is generated, the engine 102 is vibrated largely, and the large vibration is transmitted to a vehicle body. This corresponds to the large vibration which is generated when a driver turns on a starter to start the engine 102. Therefore, in an embodiment explained below, the active vibration isolating support apparatus 101 is controlled so that the vehicle vibration caused by the roll resonance of the engine 102 at the time of the initial explosion in the engine 102 is effectively protected.

This control is performed by executing a computer program stored in the ROM 71c in the CPU 71b of the ACMECU 71.

For reference's sake, in the engine 102 according to the embodiment, fuel is injected by a fuel injection pump for every cylinder.

Also, in the recent vehicle V, from the view point of controlling the exhaust gas, in order not to exhaust partially burned gas at the time of engine starting, the engine ECU 73 determines which cylinder should be an initially exploded cylinder based on an initial rotational position of the crankshaft when the starter begins to rotate (an initial position of the crank angle), more concretely, based on a crank pulse signal and a TDC signal, and injects fuel in the determined cylinder, and in the next exploded cylinder in sequence.

Figure 7:
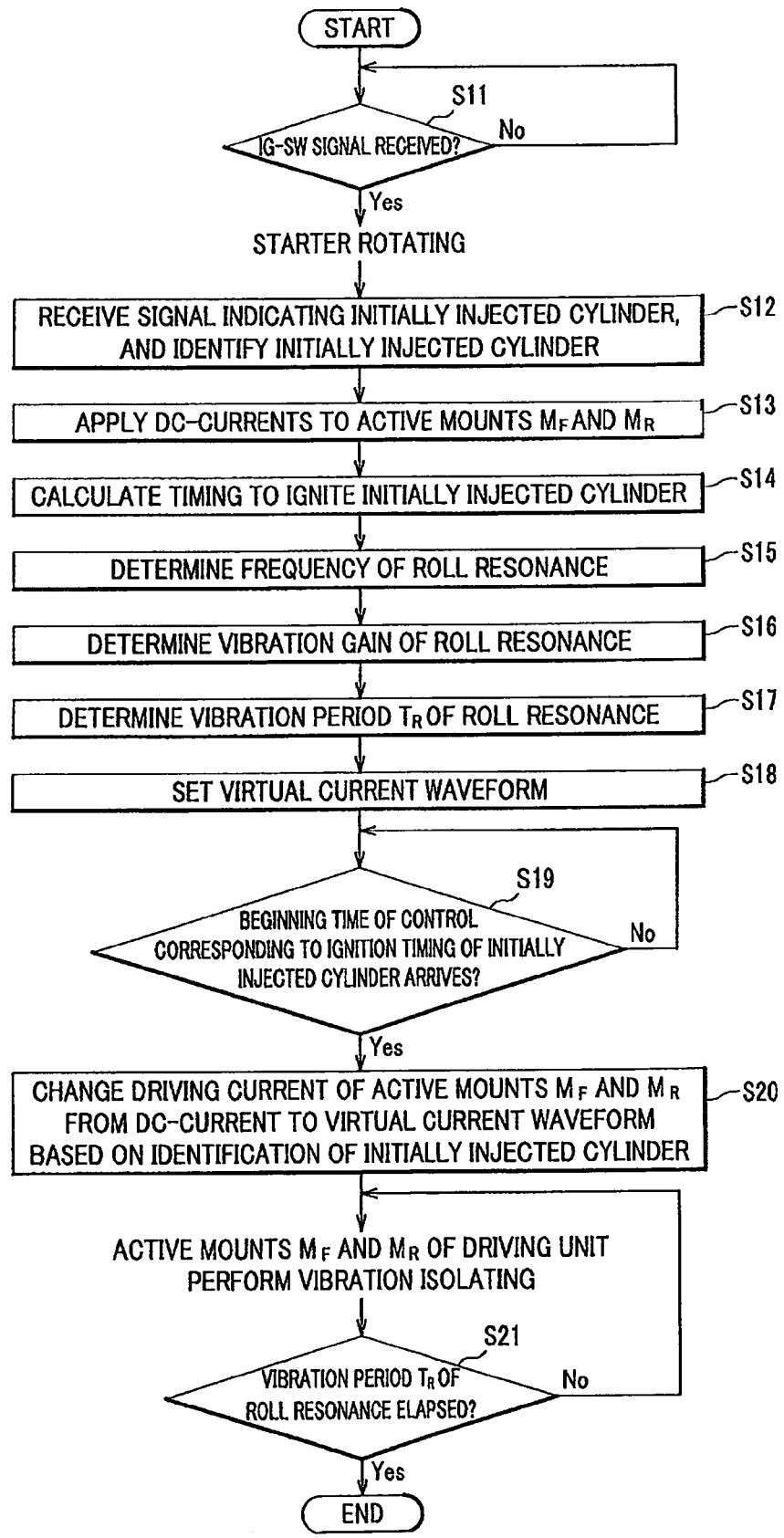
FIG. 7 is a flowchart showing a control flow of a vibration isolating support unit to a roll resonance at the time of engine starting.

With reference to FIGS. 7-9, a method for a vibration isolating support controlling of a roll resonance at the time of engine starting will be explained.

Figure 8A:
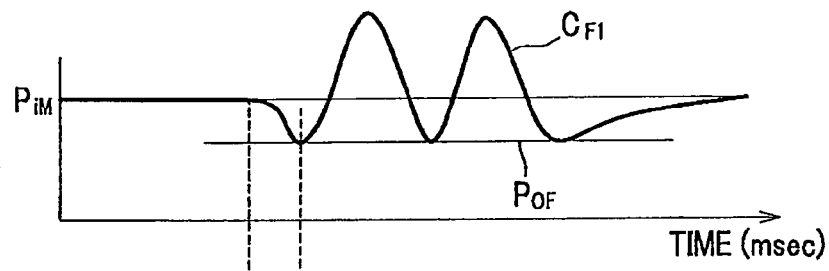
FIG. 8A shows a temporal transition of an amount of displacement of a working point of the active mount $M_F$.
Figure 8B:
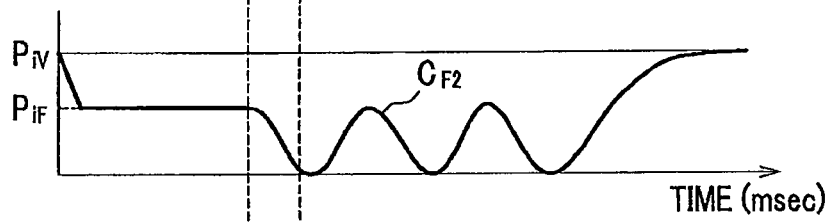
FIG. 8B shows a temporal transition of an amount of displacement of an excitation plate.
Figure 8C:
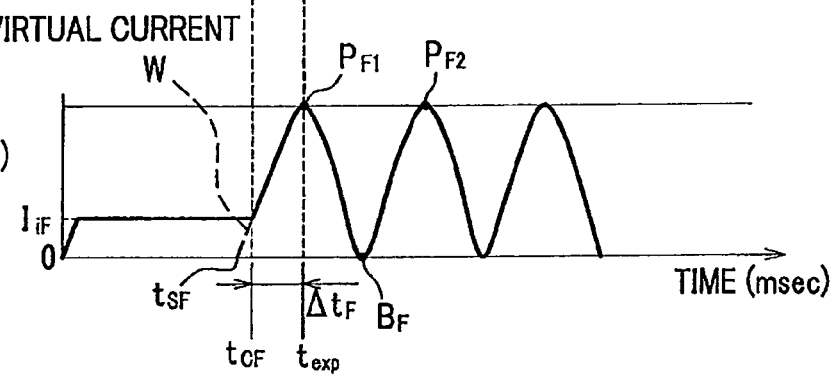
FIG. 8C shows a temporal transition of a driving current.
Figure 9A:
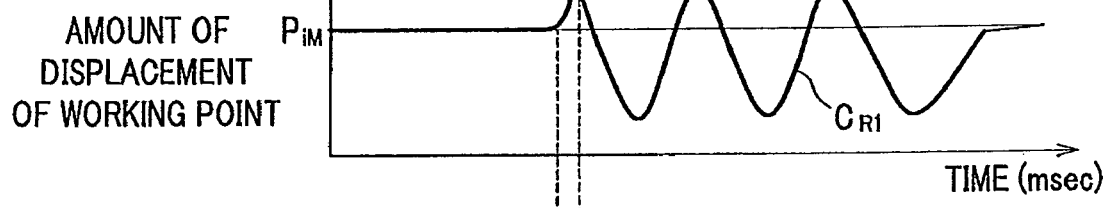
FIG. 9A shows a temporal transition of an amount of displacement of a working point of the active mount $M_R$.
Figure 9B:
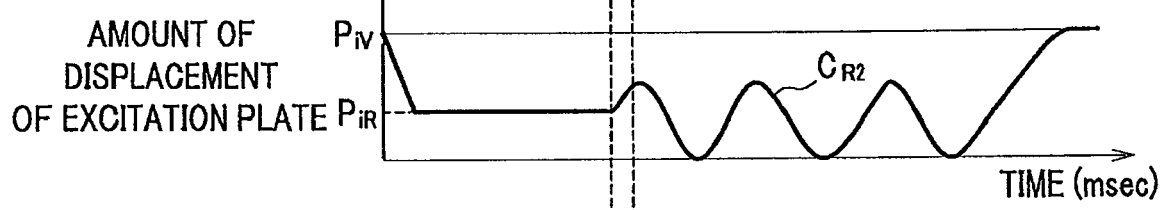
FIG. 9B shows a temporal transition of an amount of displacement of the excitation plate.
Figure 9C:
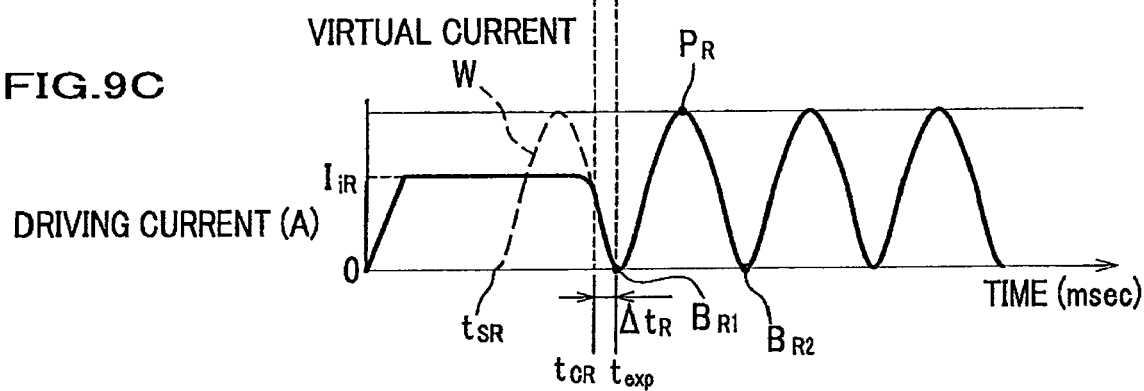
FIG. 9C shows a temporal transition of a driving current.

FIG. 7 is a flowchart of a vibration isolating support controlling of a roll resonance at the time of engine starting. FIG. 8 shows an operation of the active mount $M_F$ at the time of engine starting. FIG. 8A shows a temporal transition of an amount of displacement of a working point of the active mount $M_F$. FIG. 8B shows a temporal transition of an amount of displacement of an excitation plate. FIG. 8C shows a temporal transition of a driving current. FIG. 9 shows an operation of the active mount $M_R$ at the time of engine starting. FIG. 9A shows a temporal transition of an amount of displacement of a working point of the active mount $M_R$. FIG. 9B shows a temporal transition of an amount of displacement of the excitation plate. FIG. 9C shows a temporal transition of a driving current.

The driver turns an ignition switch to an ON position (a starter position) to start the engine. In step S11, the CPU 71b checks whether the IG-SW signal, which is output when the ignition switch is turned to the starter position, is received. When the IG-SW signal is received (Yes), the process proceeds to step S12. When the IG-SW signal is not received (No), step S11 is repeated.

When the starter begins to rotate, the engine ECU 73 determines the initially injected cylinder based on the crank pulse signal from the crank pulse sensors Sa and the TDC signal from the cam angle sensors Sb, and sends a signal indicating the initially injected cylinder to the ACMECU 71 via the communication line. At the ACMECU 71, the CPU 71b receives the signal indicating the initially injected cylinder, and identifies the initially injected cylinder (step S12).

Here, "receiving a signal indicating a initially injected cylinder" corresponds to a "condition for starting control" in claims.

Next, at the timing of identifying the initially injected cylinder, DC-currents are applied to the active mounts $M_F$ and $M_R$ (step S13).

Here, as shown in FIG. 8C and FIG. 9C, the DC-currents applied to the active mounts $M_F$ and $M_R$ have different values as $I_{iF}$ and $I_{iR}$ ($I_{iF} < I_{iR}$). The active mount $M_F$ moves a second elastic body (excitation plate) 27 to an initial position $P_{iF}$, which is lower than a position $P_{iV}$ (no power supply), to allow the second elastic body (excitation plate) 27 to perform a pushing side action, and keeps it at the initial position $P_{iF}$. The active mount $M_R$ moves the second elastic body (excitation plate) 27 to an initial position $P_{iR}$, which is lower than the position $P_{iV}$ (no power supply), to allow the second elastic body (excitation plate) 27 to perform a pull side action, and keeps it at the initial position $P_{iR}$.

For reference's sake, the relationship between the initial positions of the second elastic bodies 27 is $P_{iF} > P_{iR}$. Also, as shown in FIGS. 8C and 9C, since the DC-currents $I_{iF}$ and $I_{iR}$ slowly rise in step S13, when second elastic body (excitation plate) 27 is moved from the position $P_{iV}$ (no power supply) to the initial positions $P_{iF}$ and $P_{iR}$ respectively, liquid is moved between the first liquid chamber 30 and the second liquid chamber 31 till the balance is achieved, and an engine mounting unit (working point) 20a does not move in a vertical direction and keeps the initial position $P_{iM}$ (no power supply).

In step S14, a timing $t_{exp}$ to ignite the initially injected cylinder is calculated (see FIGS. 8C and 9C). In step S15, a frequency of the roll resonance is read from data stored in the storage device 71e or the ROM 71c to determine the frequency of the roll resonance. In step S16, a gain of the roll resonance is read from data stored in the storage device 71e or the ROM 71c to determine the vibration gain of the roll resonance. In step S17, a vibration period $T_R$ of the roll resonance is read from data stored in the storage device 71e or the ROM 71c to determine the vibration period $T_R$ of the roll resonance.

In step S18, a virtual current waveform is set. This virtual current waveform is a AC-current waveform, and is set based on the frequency determined in step S15 and the vibration gain determined in step S16.

In the active mount $M_F$, as shown in FIG. 8C, the timing $t_{exp}$ to ignite the initially injected cylinder is set to be placed at a first peak $P_{F1}$ of a continuous DC virtual current waveform. And, provided that a predetermined DC-current value $I_{iF}$ intersects the first virtual current waveform, which begins at a time $t_{SF}$, at a time $t_{CF}$.

In the active mount $M_R$, as shown in FIG. 9C, the timing $t_{exp}$ to ignite the initially injected cylinder is set to be placed at a trough BR1 between the first and the next peaks of the continuous DC virtual current waveform, and provided that a predetermined DC-current value $I_{iR}$ intersects the first virtual current waveform, which begins at a time $t_{SR}$, at a time $t_{CR}$ when the waveform declines.

Here, the time $t_{CF}$ indicates the time when the predetermined DC-current value $I_{iF}$ is changed to the virtual current waveform, and the time $t_{CR}$ indicates the time when the predetermined DC-current value $I_{iR}$ is changed to the virtual current waveform.

As described above, in order to calculate the times $t_{CF}$ and $t_{CR}$ associated with the time when the control is changed, when a signal indicating the initially injected cylinder is received in step S12 (time t=0), the data corresponding to the times $t_{SF}$ and $t_{SR}$ is prestored in the ROM 71c or the storage device 71e using the crankshaft angle and the initially injected cylinder at the time as parameters.

In step S19, it is checked whether a beginning time of the control corresponding to an ignition timing of the initially injected cylinder arrives. When the beginning time does not arrive (No), step S19 is repeated and applying of the DC-current in step S13 continues. When the beginning time of the control arrives in step S19 (Yes), the process proceeds to step S20, the driving current of the active mounts $M_F$ and $M_R$ is changed from the DC-current to the virtual current waveform. After that, each of the active mounts $M_F$ and $M_R$ is controlled in response to the virtual current waveform set in step S18 for each of the active mounts $M_F$ and $M_R$ respectively.

Here, the virtual current waveform set in step S18 for each of the active mounts $M_F$ and $M_R$ respectively corresponds to a "control instruction value" in claims.

As shown in FIGS. 8C and 9C, this changing from the DC-current to the virtual current waveform differs in timing between the active mounts $M_F$ and $M_R$.

In response to the driving current from the DC-current to the virtual current waveform, the active mounts $M_F$ and $M_R$ of the driving unit (actuator) 41 perform vibration isolating.

In the active mount $M_F$, by beginning the control in steps S19 and S20, the DC-current value $I_{iF}$ shifts to a first virtual current waveform at the time $t_{CF}$. And, the control is performed so that the peak $P_{F1}$ of the first virtual current waveform, a trough $B_F$ (current value zero A) of a second virtual current waveform succeeding to the first virtual current waveform, and a peak $P_{F2}$ of the second virtual current waveform match a peak-trough-peak waveform of a load changing in the active mount $M_F$ associated with the roll resonance caused by the initial explosion.

In addition, in order to maximize an amount of displacement on the pushing side of the engine mounting unit (working point) 20a in the active mount $M_F$, the current value at the trough $B_F$ is defined to be zero.

As a result, like a curve $C_{F2}$ shown in FIG. 8B, the second elastic body (excitation plate) 27 is kept at the initial position $P_{iF}$ by using the initial DC-current value $I_{iF}$, is moved to the lowest point, and moves up and down to match the peak-trough-peak waveform of the load changing in the active mount $M_F$. In response to the changing in position of the second elastic body (excitation plate) 27, the first elastic body 19 moves up and down, and like a curve $C_{F1}$ shown in FIG. 8A, the engine mounting unit (working point) 20a is kept at the initial position $P_{iM}$ by using the initial DC-current value $I_{iF}$, is moved to a virtual zero point P0F, and moves up and down to match the peak-trough-peak waveform of the load changing in the active mount $M_F$.

Likewise, in the active mount $M_R$, by beginning the control in steps S19 and S20, the DC-current value $I_{iR}$ shifts to a first virtual current waveform at the time $t_{CR}$. And, the control is performed so that a trough BR1 (current value zero A) of the second virtual current waveform succeeding to the first virtual current waveform, a peak PR of the second virtual current waveform, and a trough BR2 of a third virtual current waveform succeeding to the second virtual current waveform match a trough-peak-trough waveform of a load changing in the active mount $M_R$ associated with the roll resonance caused by the initial explosion.

In addition, in order to maximize an amount of displacement on the pulling side of the engine mounting unit (working point) 20a in the active mount $M_R$, the current value at the trough BR1 is defined to be zero.

As a result, like a curve CR2 shown in FIG. 9B, the second elastic body (excitation plate) 27 is kept at the initial position $P_{iR}$ by using the initial DC-current value $I_{iR}$, is moved to the highest point, and moves up and down to match the trough-peak-trough waveform of the load changing in the active mount $M_R$. In response to the changing in position of the second elastic body (excitation plate) 27, the first elastic body 19 moves up and down, and like a curve CR1 shown in FIG. 9A, the engine mounting unit (working point) 20a is kept at the initial position $P_{iM}$ by using the initial DC-current value $I_{iR}$, is moved to a virtual zero point P0R, and moves up and down to match the trough-peak-trough waveform of the load changing in the active mount $M_R$.

In step S21, it is checked whether a vibration period $T_R$ of the roll resonance has elapsed. When the vibration period $T_R$ of the roll resonance has not elapsed (No), the operation of the driving unit (actuator) 41 of the active mounts $M_F$ and $M_R$ continues. When the vibration period $T_R$ of the roll resonance has elapsed (Yes), the vibration isolating support control to the roll resonance at the time of engine starting is completed and the driving current of the driving unit 41 is allowed to be zero. In the embodiments shown in FIGS. 8C and 9C, the driving current is controlled to be stopped when the continuous virtual current waveform arrives at the trough (current value zero), and a termination timing of control for the active mount $M_F$ differs from that for the active mount $M_R$. By such control, when controls for the active mounts $M_F$ and $M_R$ are terminated, less vibration is transmitted to a vehicle body.

When the vibration isolating control of the active mounts $M_F$ and $M_R$ is completed, the second elastic body (excitation plate) 27 returns to the position $P_{iV}$ (no power supply), and the engine mounting unit (working point) 20a returns to the initial position $P_{iM}$ (no power supply).

Next, with reference to FIGS. 10-14, an effect of the vibration isolating control of the active vibration isolating support apparatus 101 according to the embodiment at the time of engine starting will be explained.

Figure 11:
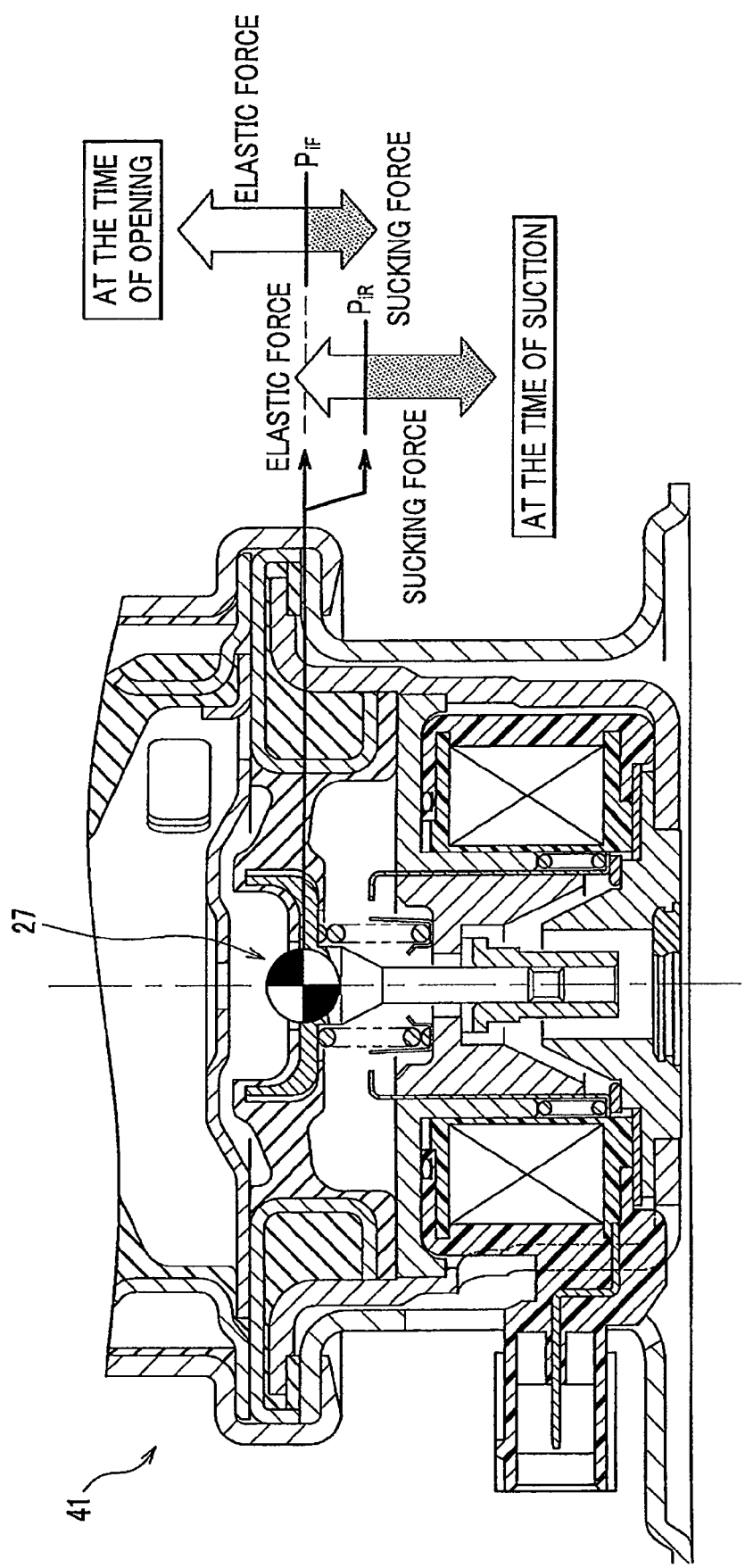
FIG. 11 shows a range of an elastic force (a range of force at a pushing side) from the virtual zero point when the driving current is decreased (at the time of opening), and a range of sucking force (a range of force at a pulling side) from the virtual zero point when the driving current is applied after the second elastic body (excitation plate) being moved to an initial position.
Figure 12:
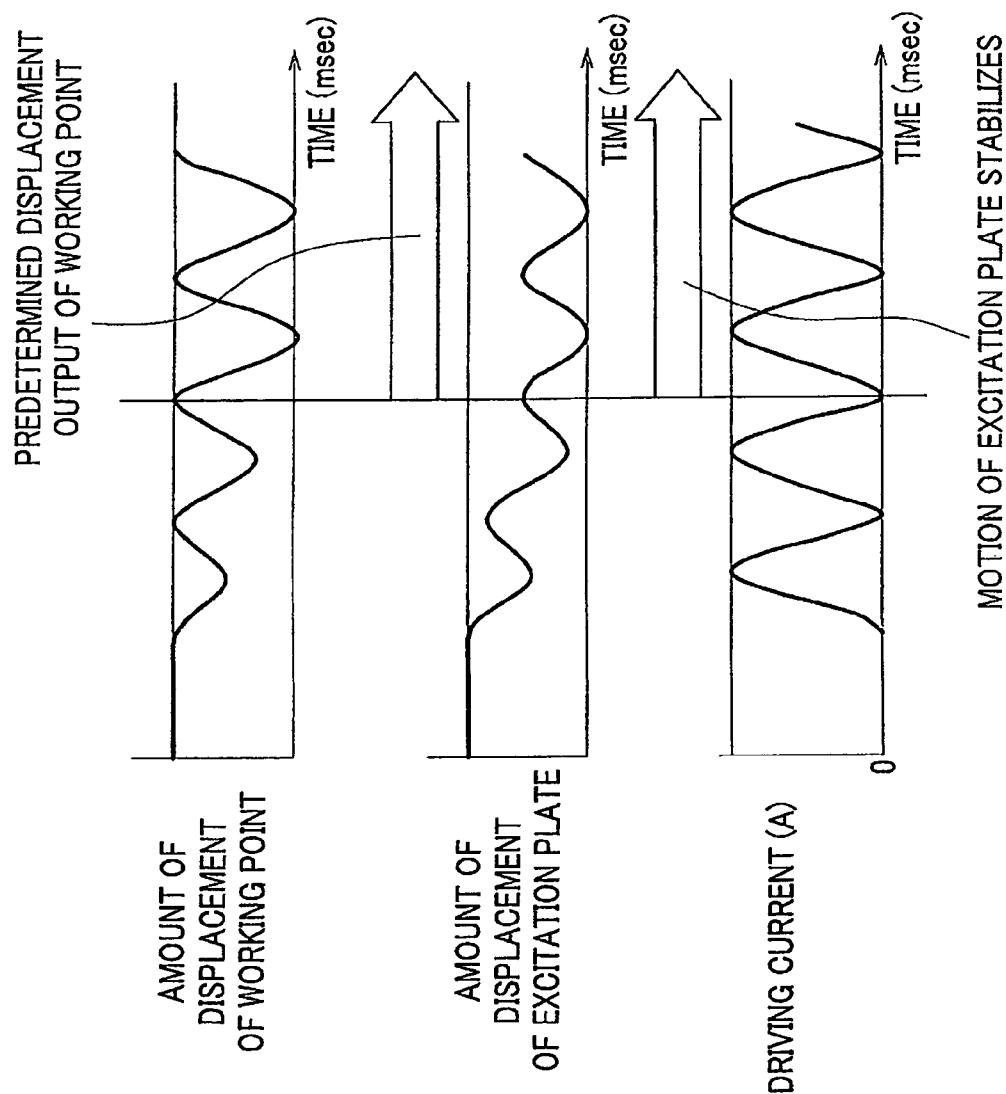
FIG. 12 shows a temporal transition of an amount of displacement of the working point, a temporal transition of an amount of displacement of the excitation plate, and a temporal transition of the driving current when an initial explosion of the engine is begun at the time of engine starting and a DC-driving current is applied to an active mount to a vibration caused by the roll resonance.

FIG. 10 shows an engine vibration at the time of engine starting. FIG. 10A shows a pulse signal indicating the engine revolution speed Ne. FIG. 10B shows a curve indicating an engine vibration (load (N)) acting on a mount point when a general engine mount which is not the active vibration isolating support apparatus is used. FIG. 11 shows a range of an elastic force (a range of force at a pushing side) from the virtual zero point when the driving current is decreased (at the time of opening), and a range of sucking force (a range of force at a pulling side) from the virtual zero point when the driving current is applied after the second elastic body (excitation plate) 27 being moved to an initial position. FIG. 12 shows a temporal transition of an amount of displacement of the working point, a temporal transition of an amount of displacement of the excitation plate, and a temporal transition of the driving current when an initial explosion of the engine is begun at the time of engine starting and a DC-driving current is applied to an active mount to a vibration caused by the roll resonance.

As shown in FIG. 10, when the active vibration isolating support apparatus is not provided, a roll resonance occurs at the time of engine starting, a large load is applied to an engine mount immediately after engine starting which is referred to as "initial explosion" (i.e., beginning of self-revolution by continuous explosion in cylinder), and the load continues for a while (i.e., for a period referred to as "notable range"). Even if we try to prevent the roll resonance from being transmitted to a vehicle body by absorbing such roll resonance occurring at the time of engine starting by using the active vibration isolating support apparatus 101 according to the embodiment, in the case of a linear solenoid type driving unit 41, with respect to the front side active mount $M_F$ to perform push side action and the rear side active mount $M_R$ to perform pull side action, the following limitations are found.

(1) With respect to an operable force range for the active mount $M_F$, if the initial position $P_{iF}$ of the second elastic body (excitation plate) 27 is not preset higher than the initial position $P_{iR}$ of the active mount $M_R$, a range of an elastic force at the time of opening (when the driving current is decreased) can not be secured widely.

(2) Conversely, with respect to an operable force range for the active mount $M_R$, if the initial position $P_{iR}$ of the second elastic body (excitation plate) 27 is not preset lower than the initial position $P_{iF}$ of the active mount $M_F$, a range of a sucking force at the time of suction (when the driving current is increased) can not be secured widely.

Therefore, at the time of engine starting, if we try to cope with the roll resonance by beginning control of the driving current of the active mounts $M_F$ and $M_R$ immediately after the initial explosion, the second elastic body (excitation plate) 27 does not move to a suitable position during first AC-driving as shown in FIG. 12. As a result, the active mount $M_F$ on the pushing side can not exert the enough elastic force, and the active mount $M_R$ on the pulling side can not exert the enough sucking force, a motion of the second elastic body (excitation plate) 27 stabilizes at the time when the vibration caused by the roll resonance has been repeated to some extent, and a predetermined displacement output of the engine mounting unit (working point) 20a can be obtained. In such a circumstance, it is impossible to suppress a transmission of the roll resonance to the vehicle body immediately after the initial explosion.

Figure 13A:
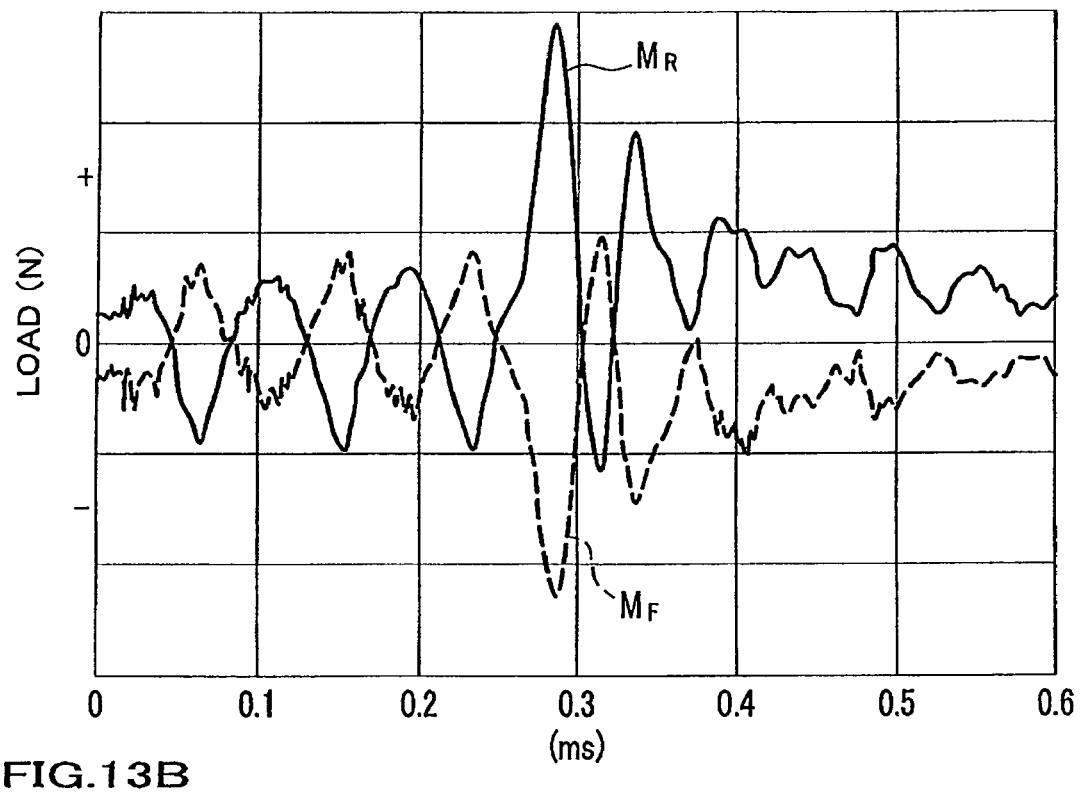
FIG. 13A is a curve showing a temporal transition of a load applied to a vehicle body frame when the active vibration isolating support apparatus according to the embodiment is not operated.
Figure 13B:
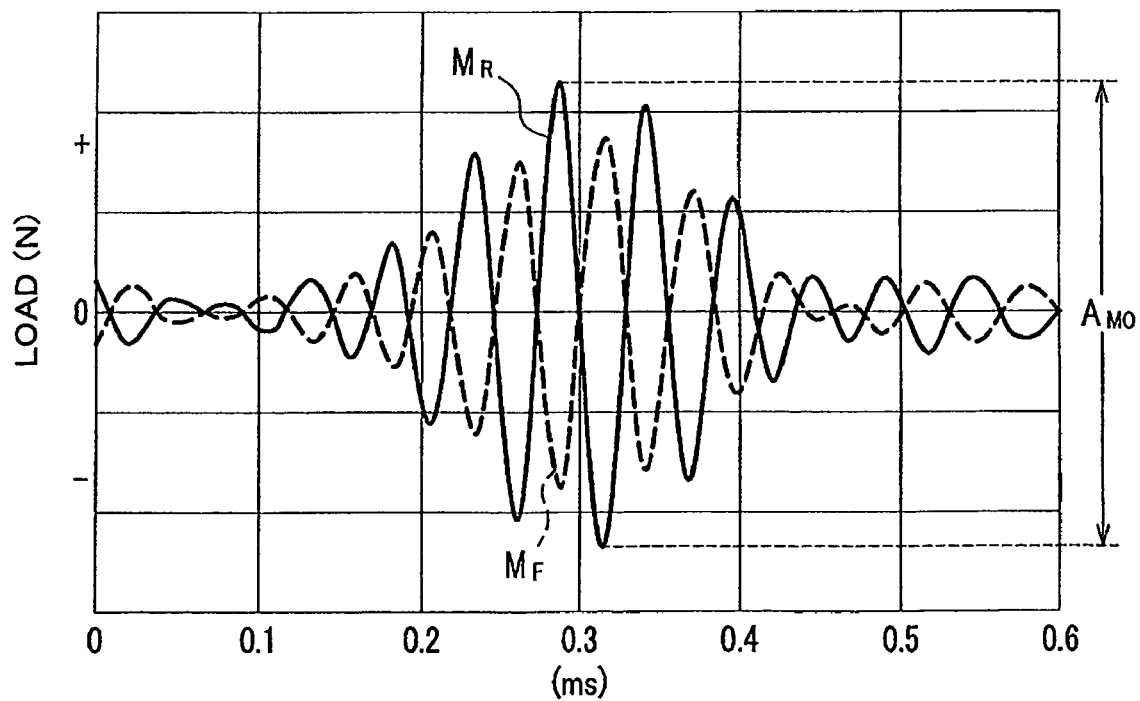
FIG. 13B is a band-pass filtered curve of FIG. 13A over a range of 15-21 Hz.
Figure 14A:
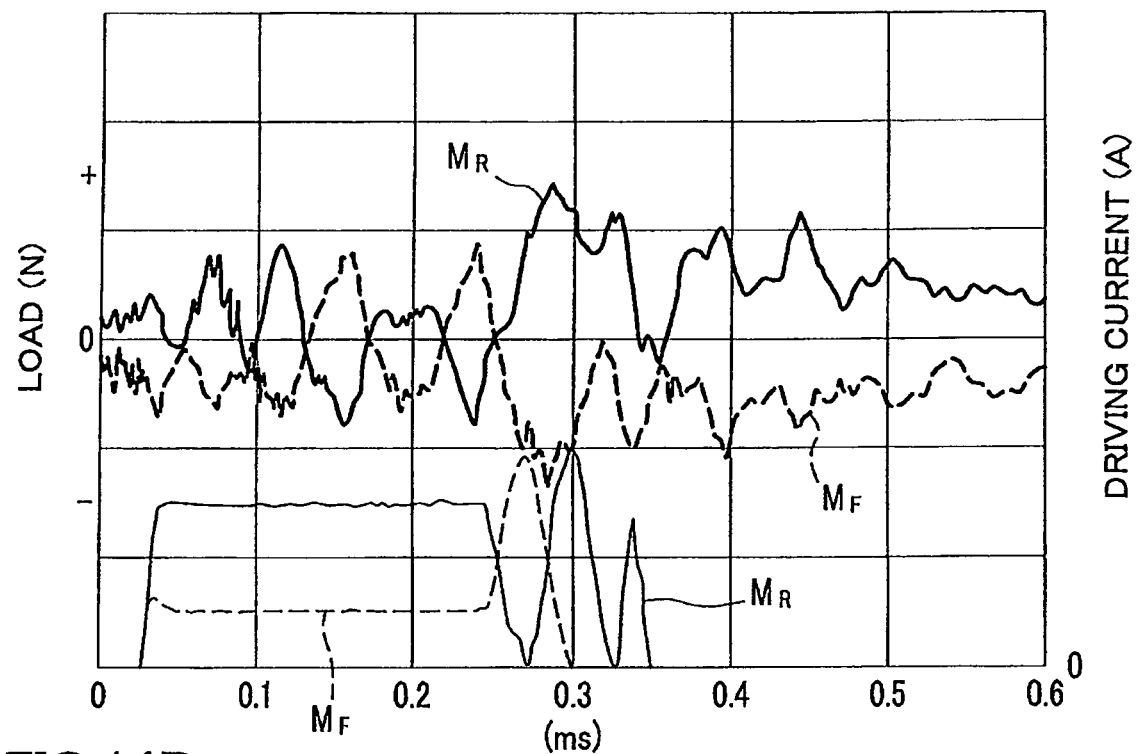
FIG. 14A is a curve showing a temporal transition of a load applied to a vehicle body frame when the active vibration isolating support apparatus according to the embodiment is operated.
Figure 14B:
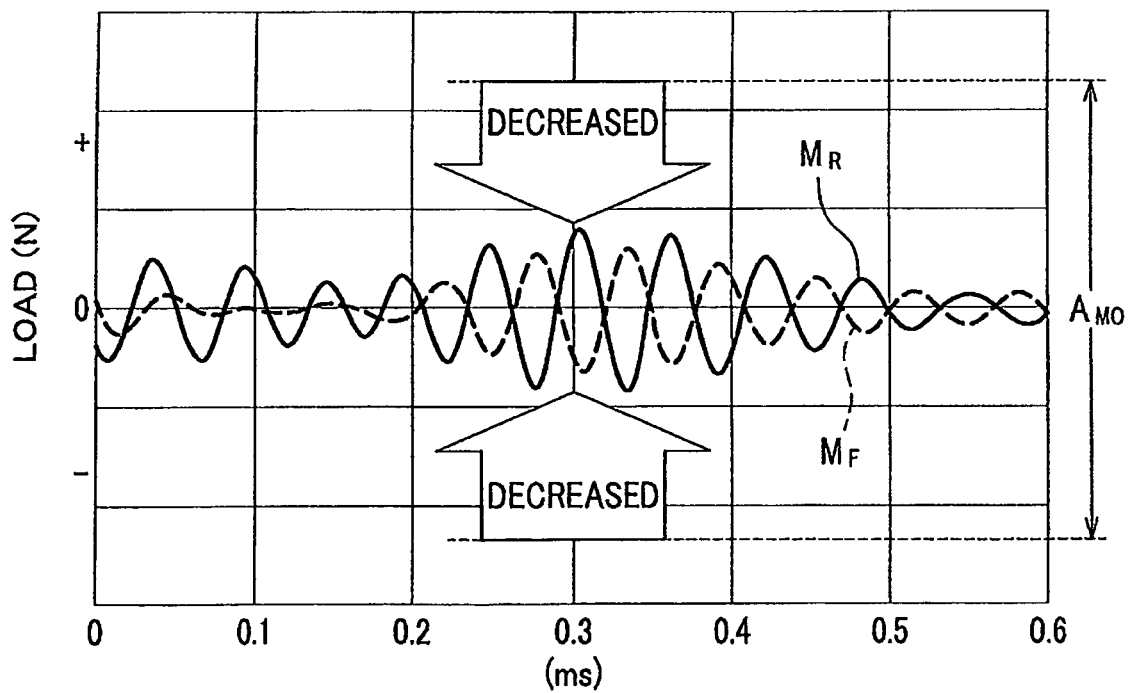
FIG. 14B is a band-pass filtered curve of FIG. 14A over a range of 15-21 Hz.
Figure 15:
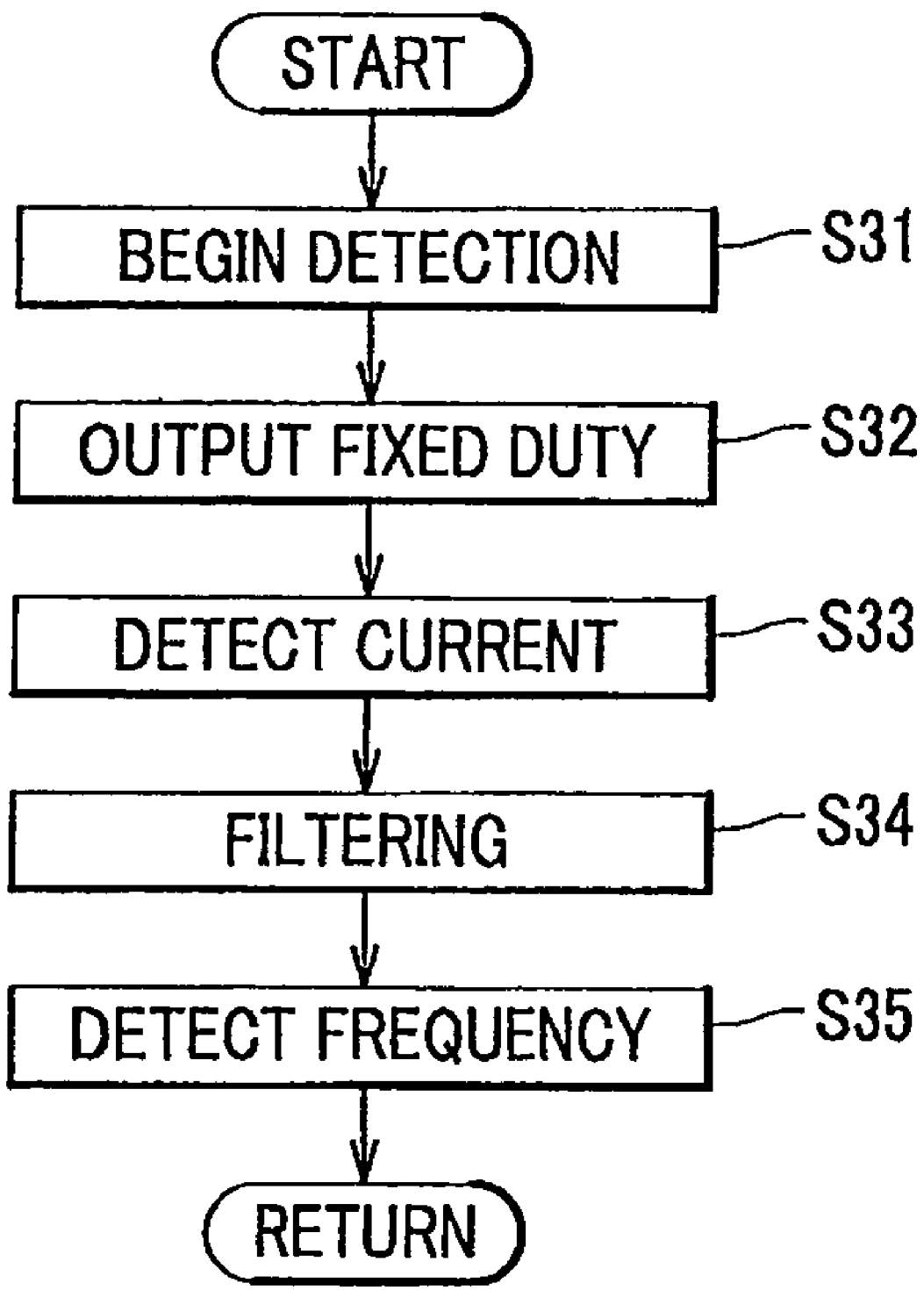
FIG. 15 is a flowchart showing a process to detect a vibration frequency.

FIG. 13A is a curve showing a temporal transition of a load applied to a vehicle body frame when the active vibration isolating support apparatus according to the embodiment is not operated. FIG. 13B is a band-pass filtered curve of FIG. 13A over a range of 15-21 Hz. In contradistinction, FIG. 14A is a curve showing a temporal transition of a load applied to a vehicle body frame when the active vibration isolating support apparatus according to the embodiment is operated. FIG. 14B is a band-pass filtered curve of FIG. 14A over a range of 15-21 Hz.

In FIGS. 13 and 14, "$M_F$" means a curve for the active mount $M_F$, and "$M_R$" means a curve for the active mount $M_R$.

In addition, in FIG. 14A, a bold line indicates the load (N), and a thin line indicates the driving current (A).

According to the embodiment, comparing FIG. 13B to FIG. 14B, a magnitude AM0 of the load applied to the vehicle body is drastically decreased.

As shown in the embodiment, at the timing when the ACMECU 71 obtains a signal indicating the initially injected cylinder from the engine ECU 73 immediately after the engine 102 begins to rotate by the starter, and a predetermined DC-currents are applied to the active mounts $M_F$ and $M_R$ to move the second elastic bodies (excitation plate) 27 to the initial positions $P_{iF}$ and $P_{iR}$. As a result, from the beginning of the vibration caused by the roll resonance occurred at the time of the initial explosion, an operable range of the elastic or sucking force for the active mounts $M_F$ and $M_R$ can be secured widely, and it is possible to effectively absorb the vibration caused by the roll resonance to suppress the vibration transmitted to the vehicle body frame suppress.

Also, since the driving unit (actuator) 41 is a linear solenoid, it can decrease a delay in a rising time of current in the solenoid. As a result, the working point of the active vibration isolating support apparatus 101 can stabilizes soon.

In addition, in this embodiment, for example, although the control is started at the time $t_{CF}$ in the active mount $M_F$, the control may be started at the time $t_{SF}$, and a duty cycle of setting a current value may be changed from the time when the current value arrives at the current value $I_{iF}$. Likewise, although the control is started at the time $t_{CR}$ in the active mount $M_R$, the control may be started at the time $t_{SR}$, and a duty cycle of setting a current value may be changed from the time when the current value arrives at the current value $I_{iR}$. As a result, a map to define the virtual current waveform, and control steps of a program can be shared between the active mount $M_F$ and the active mount $M_R$, and the system can be simplified.

MODIFIED EMBODIMENT

Next, an modified embodiment will be explained.

A feature of the modified embodiment is that the system learns the current waveform and its cycle used to control the driving unit 41 at the time of starting described above during the engine 102 is stopped, and stored them in a nonvolatile memory to use them at the next time of starting of the engine 102.

Hereinafter, a process to prevent a vibration caused by the roll resonance occurring at the time when the engine 102 is stopped from being transmitted to a vehicle body frame, and a process to learn the current waveform and its frequency will be explained. In these processes, a program stored in the ROM 71c is mainly executed in the CPU 71b, and the power supply parts 72A and 72B are controlled.

Hereinafter, although an explanation for the active mount $M_F$ will be described, an explanation for the active mount $M_R$ is the same, and corresponding reference numbers of the active mount $M_R$ are described in ( ).

The power supply part 72A (72B) includes a current detecting circuit 72a, and the current detecting circuit 72a includes a current detecting sensor (not shown) and a low-pass filter (LPF) (not shown).

Figure 16A:
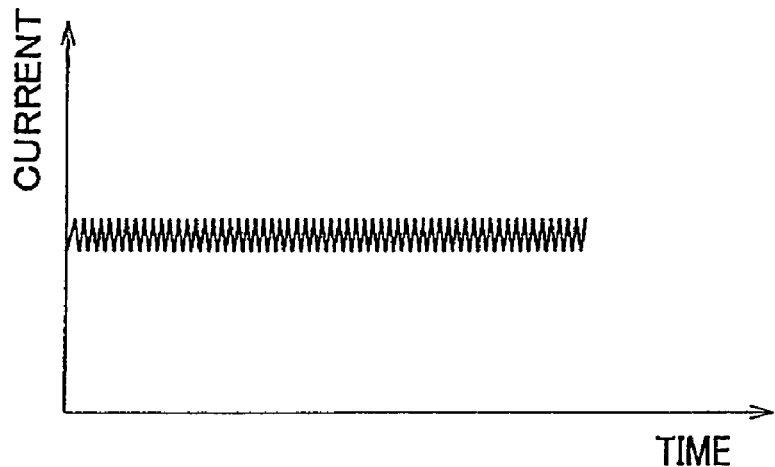
FIG. 16 shows waveforms of currents detected by a current detecting circuit.

When a stop signal of the engine 102 is sent from the engine ECU 73 to the ACMECU 71 at the time when the engine 102 is stopped in step S31, the CPU 71b sends a PWM instruction of a fixed duty to the power supply part 72A (72B) in step S32, and a DC-current is supplied to the driving unit 41 of the active mount $M_F$ ($M_R$) (see FIG. 16A). Here, the DC-current vibrates minutely under the influence of chopping of PWM.

As a result, the second elastic body 27 is sucked, and is moved to the predetermined virtual zero point.

On the other hand, the engine 102 begins a stop motion in response to a control signal from the engine ECU 73, and decreases its revolution speed gradually. In the process in which the revolution speed of the engine 102 is decreased, a vibration is transmitted from the engine 102 to the active mount $M_F$ ($M_R$), a load applied to a first elastic body 19 is changed by the vibration, thereby the first elastic body 19 is deformed and a capacity of a first liquid chamber 30 is changed. Associated with change in the capacity of this first liquid chamber 30, a movable core 54 connected to a movable member 28 reciprocates relative to a coil 46, thereby an AC-counter current is generated in the coil 46 in response to the waveform of the vibration of the engine 102 and this AC-counter current is superimposed on a constant current supplied from the power supply part 72A (72B).

Figure 16B:
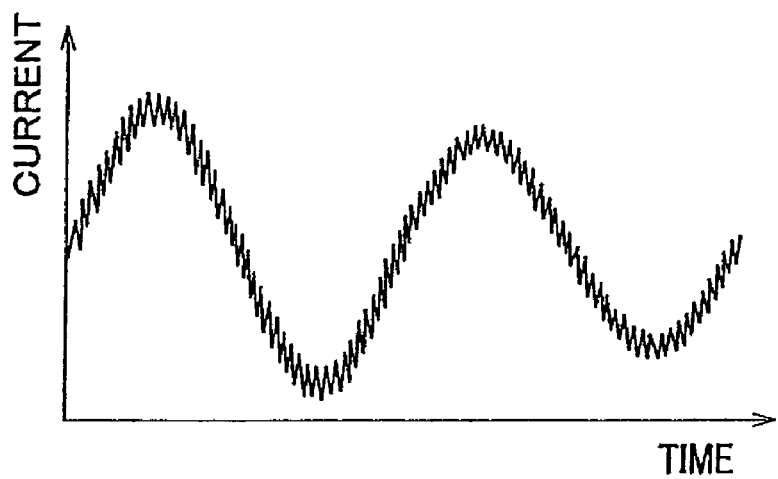
Figure 16C:
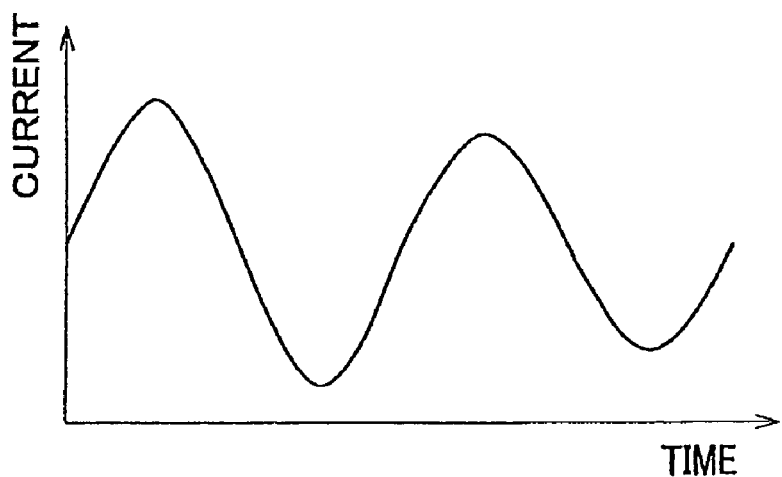

When the superimposed current is detected by a current sensor of the current detecting circuit 72a is step S33 (see FIG. 16B), a current value signal detected by the current detecting circuit 72a is filtered by a low-pass filter in step S34, and a pulsating current caused by the chopping of PWM is removed to leave an AC-current component corresponding to the vibration component of the engine 102 (see FIG. 16B). The CPU 71b detects a vibration frequency of the engine 102 from a frequency of the AC-current in step S35. A frequency having an amplitude larger than the predetermined amplitude in the detected AC-current is stored in a storage device 71*e* as a roll resonance frequency, and is used as a frequency in a vibration control at the time of next engine starting.

Figure 17:
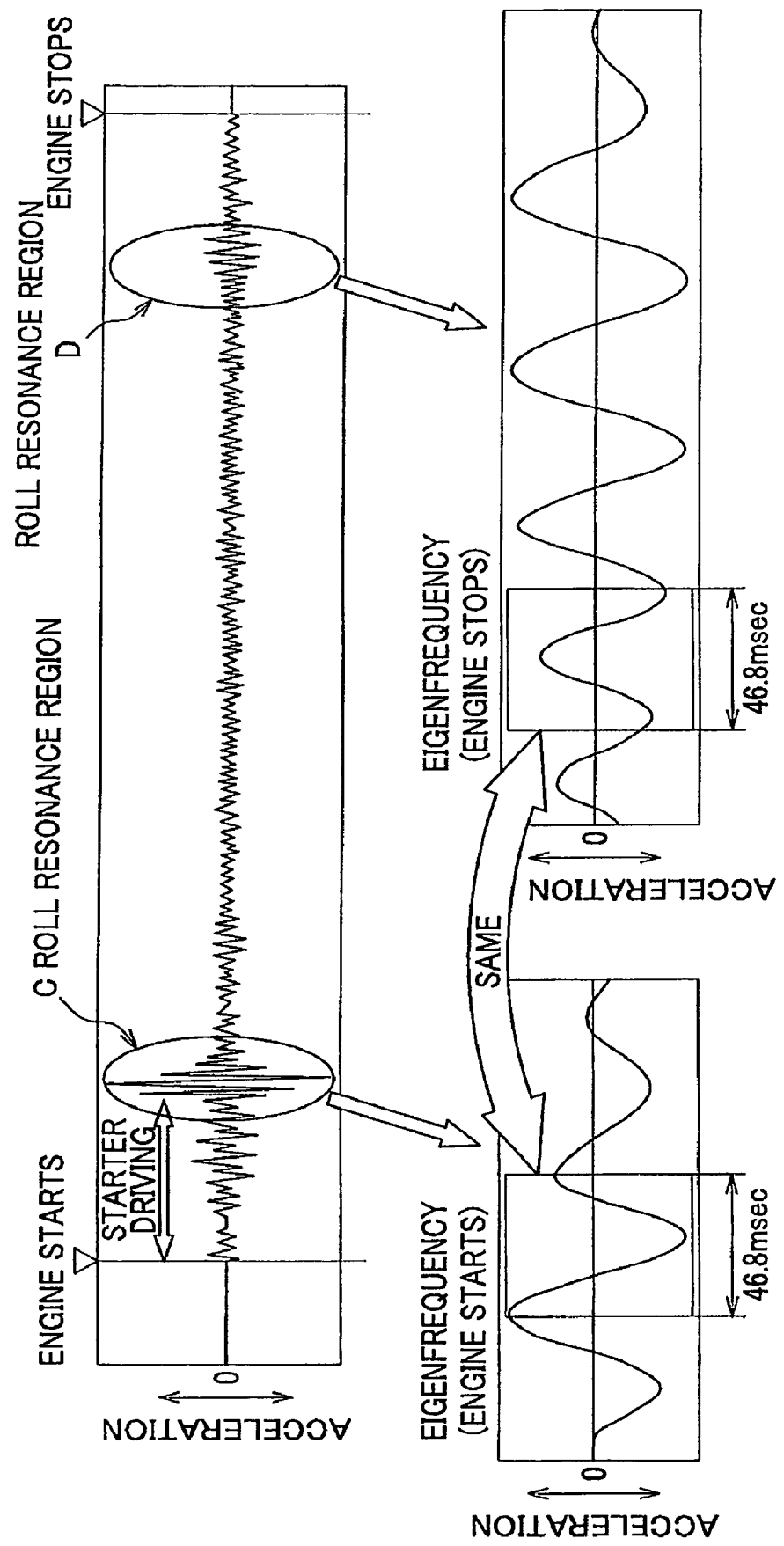
FIG. 17 shows waveforms of a roll vibration of an engine.

As is apparent from FIG. 17, the roll resonance of the engine 102 occurs at the time of starting and stopping. Although the cycle (frequency) of the roll resonance at the time of starting is the same as that at the time of stopping, the amplitude at the time of starting is larger than that at the time of stopping. Therefore, the frequency of the roll resonance may be detected at the time of stopping, and the vibration caused by the roll resonance at the time of next starting can be effectively suppressed by using the frequency. In addition, it is possible to have effective vibration isolating performance by controlling the operation of the active vibration isolating support apparatus 101 based on the latest eigenfrequency detected periodically.

In this embodiment, the engine 102 is the V engine with six-cylinders, but should not limited to that. A V engine with eight-cylinders, a straight four engine, a horizontal opposed 4-cylinder engine, and etc. may be used.

What is claimed is:

1. An active vibration isolating support apparatus for suppressing a vibration transmitted to a vehicle body, comprising:
    active mounts which elastically support a load of an engine in the vehicle body, each of which includes an actuator; and
    a control unit which drives the actuator to extend and contract periodically in response to a waveform of the vibration of the engine so that an excitation plate fixed to the actuator is moved up and down;
    wherein when a signal to specify an initially injected cylinder is received from an engine ECU, the control unit also supplies a predetermined current to and drives the actuator based on a starting control condition so that the excitation plate is moved to an initial position which is lower than a position of the excitation plate at the time of no power supply, and starts a control of the actuator based on a control instruction value of a current in response to the vibration of the engine after the engine has started.

2. An active vibration isolating support apparatus according to claim 1,
    wherein the control instruction value is calculated based on a frequency of a roll resonance and a vibration gain of the roll resonance.

3. An active vibration isolating support apparatus according to claim 2, wherein the starting control condition is set by beginning the engine starting.

4. An active vibration isolating support apparatus according to claim 3, wherein a control of the control instruction value of the current in response to the subsequent vibration of the engine is started based on a position of an initially exploded cylinder determined by at least a crank angle at the time when the engine begins to rotate.

5. An active vibration isolating support apparatus according to claim 4, wherein the control instruction value of the current in response to the subsequent vibration of the engine is based on a frequency of a roll resonance obtained at the time when the engine is stopped.

6. An active vibration isolating support apparatus according to claim 2, wherein the actuator is a linear solenoid.

7. An active vibration isolating support apparatus according to claim 1, wherein the starting control condition is set by beginning the engine starting.

8. An active vibration isolating support apparatus according to claim 7, wherein the actuator is a linear solenoid.

9. An active vibration isolating support apparatus according to claim 1, wherein a control of the control instruction value of the current in response to the subsequent vibration of the engine is started based on a position of an initially exploded cylinder determined by at least a crank angle at the time when the engine begins to rotate.

10. An active vibration isolating support apparatus according to claim 9, wherein the actuator is a linear solenoid.

11. An active vibration isolating support apparatus according to claim 1, wherein the actuator is a linear solenoid.

12. An active vibration isolating support apparatus according to claim 1, wherein the control instruction value of the current in response to the subsequent vibration of the engine is based on a frequency of a roll resonance obtained at the time when the engine is stopped.

* * * * *